United States Patent
Youn et al.

(10) Patent No.: US 12,207,182 B2
(45) Date of Patent: Jan. 21, 2025

(54) UE FOR ESTABLISHING PDU SESSION, AND TWIF

(71) Applicant: LG ELECTRONICS INC., Seoul (KR)

(72) Inventors: Myungjune Youn, Seoul (KR); Hyunsook Kim, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 714 days.

(21) Appl. No.: 17/421,711

(22) PCT Filed: Dec. 2, 2019

(86) PCT No.: PCT/KR2019/016839
§ 371 (c)(1),
(2) Date: Jul. 8, 2021

(87) PCT Pub. No.: WO2020/149522
PCT Pub. Date: Jul. 23, 2020

(65) Prior Publication Data
US 2022/0086744 A1    Mar. 17, 2022

(30) Foreign Application Priority Data
Jan. 15, 2019    (KR) .................. 10-2019-0005387

(51) Int. Cl.
*H04W 36/14*    (2009.01)
*H04W 12/06*    (2021.01)
(Continued)

(52) U.S. Cl.
CPC .......... *H04W 48/18* (2013.01); *H04W 12/06* (2013.01); *H04W 76/10* (2018.02); *H04W 36/1446* (2023.05); *H04W 84/12* (2013.01)

(58) Field of Classification Search
CPC .............................. H04W 36/00; H04W 48/00
See application file for complete search history.

(56) References Cited

U.S. PATENT DOCUMENTS

2020/0137672 A1*    4/2020    Rommer ............... H04W 80/10
2021/0176613 A1*    6/2021    Purkayastha ........... H04L 67/10
2021/0321258 A1*    10/2021    Salkintzis ............. H04W 12/06

FOREIGN PATENT DOCUMENTS

WO    2016072899    5/2016
WO    2018087696    5/2018

OTHER PUBLICATIONS

PCT International Application No. PCT/KR2019/016839, International Search Report dated Mar. 26, 2020, 4 pages.
(Continued)

*Primary Examiner* — Shukri Taha
(74) *Attorney, Agent, or Firm* — LEE, HONG, DEGERMAN, KANG & WAIMEY

(57) ABSTRACT

Provided in one disclosure of the present specification is a user equipment (UE) for establishing a Protocol Data Unit (PDU) session. The UE may include: a transmission and reception unit; and a processor for controlling the transmission and reception unit. The processor may perform: a step for assessing whether there is a possibility of the PDU session being handed over to a non-3rd Generation Partnership Project (non-3GPP) access; a step for determining the ID of the PDU session according to the assessment; and a step for transmitting a message including the determined ID of the PDU session.

8 Claims, 25 Drawing Sheets

(51) Int. Cl.
*H04W 48/18* (2009.01)
*H04W 76/10* (2018.01)
*H04W 84/12* (2009.01)

(56) References Cited

OTHER PUBLICATIONS

3rd Generation Partnership Project (3GPP), "Technical Specification Group Services and System Aspects; Sutdy on the Wireless and Wireline Convergence for the 5G system architecture (Release 16)," 3GPP TR 23.716 V2.0.0, Dec. 2018, Sections 7.3-7.4, 184 pages.
Mortorola Mobility, et al., "Conclusions about UEs not supporting NAS over WLAN access," SA WG2 Meeting #129bis, S2-1811837, Nov. 2018, Section 2, 21 pages.
Nokia Bell, et al., "Update to Solution #7.3: Access to 5GC from UEs without supporting NAS on non-3GPP access," SA WG2 Meeting #129b, S2-1812038, Nov. 2018, Section 7.3, 7 pages.

* cited by examiner

UE FOR ESTABLISHING PDU SESSION, AND TWIF

CROSS-REFERENCE TO RELATED APPLICATIONS

This application is the National Stage filing under 35 U.S.C. 371 of International Application No. PCT/KR2019/016839, filed on Dec. 2, 2019, which claims the benefit of earlier filing date and right of priority to Korean Patent Application No. 10-2019-0005387, filed on Jan. 15, 2019, the contents of which are all incorporated by reference herein in their entirety.

TECHNICAL FIELD

This specification relates to mobile communication.

BACKGROUND

With the success of long term evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

The fifth-generation communication defined by the international telecommunication union (ITU) refers to providing a maximum data transmission speed of 20 Gbps and a maximum transmission speed of 100 Mbps per user in anywhere. It is officially called "IMT-2020" and aims to be released around the world in 2020.

The fifth-generation mobile communication supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

NR frequency band is defined as a frequency range of two types, i.e., FR1, FR2. FR1 is 410 MHz-7125 MHz, and FR2 is 24250 MHz-52600 MHz, meaning millimeter wave (mmW).

The ITU suggests three usage scenarios, for example, enhanced mobile broadband (eMBB), massive machine type communication (mMTC), and ultra-reliable and low latency communications (URLLC).

URLLC relates to a usage scenario in which high reliability and low delay time are required. For example, services like autonomous driving, automation, and virtual realities requires high reliability and low delay time (e.g., 1 ms or less). A delay time of the current 4G (LTE) is statistically 21-43 ms (best 10%), 33-75 ms (median). Thus, the current 4G (LTE) is not sufficient to support a service requiring a delay time of 1 ms or less.

Next, the eMBB relates to a usage scenario that requires a mobile ultra-wideband.

These ultra-wideband high-speed services seem to be difficult to accommodate by existing core networks designed for LTE/LTE-A.

Therefore, the redesign of core networks is urgently needed in so-called fifth-generation mobile communications.

FIG. 1 is a structural diagram of a next-generation mobile communication network.

The 5G core network (5GC) may include various components, part of which are shown in FIG. 1, including an access and mobility management function (AMF) 41, a session management function (SMF) 42, a policy control function (PCF) 43, a user plane function (UPF) 44, an application function (AF) 45, a unified data management (UDM) 46 and a non-3GPP interworking function (N3IWF) 49.

A UE 10 is connected to a data network via the UPF 44 through a next generation radio access network (NG-RAN).

The UE 10 may be provided with a data service even through untrusted non-3GPP access, e.g., a wireless local area network (WLAN). In order to connect the non-3GPP access to a core network, the N3IWF 59 may be deployed.

FIG. 2 is an exemplary diagram illustrating a predicted structure of a next generation mobile communication in terms of a node.

Referring to FIG. 2, the UE is connected to a data network (DN) through a next generation radio access network (NGO-RAN).

The control plane function (CPF) node as shown may perform all or part of the mobility management entity (MME) function of the fourth generation mobile communication, and all or a part of the control plane function of the serving gateway (S-GW) and the PDN-gateway (P-GW) of the fourth generation mobile communication. The CPF node includes an access and mobility management Function (AMF) node and a session management function (SMF).

The user plane function (UPF) node as shown is a type of a gateway over which user data is transmitted and received. The UPF node may perform all or part of the user plane functions of the S-GW and the P-GW of the fourth generation mobile communication.

The policy control function (PCF) node as shown is configured to control a policy of the service provider.

The application function (AF) node as shown refers to a server for providing various services to the UE.

The unified data management (UDM) node as shown refers to a type of a server that manages subscriber information, such as a home subscriber server (HSS) of 4th generation mobile communication. The UDM node stores and manages the subscriber information in the Unified Data Repository (UDR).

The authentication server function (AUSF) node as shown authenticates and manages the UE.

The network slice selection function (NSSF) node as shown refers to a node for performing network slicing as described below.

In FIG. 2, a UE can simultaneously access two data networks using multiple protocol data unit (PDU) sessions.

FIG. 3 is an exemplary diagram illustrating an architecture for supporting simultaneously access two data networks.

FIG. 3 illustrates an architecture that allows the UE to simultaneously access two data networks using one PDU session.

Reference points shown in FIGS. 2 and 3 are as follows.
N1 is a reference point between UE and AMF.
N2 is a reference point between (R)AN and AMF.
N3 is a reference point between (R)AN and UPF.
N4 is a reference point between SMF and UPF.
N5 is a reference point between PCF and AF.
N6 is a reference point between UPF and DN.
N7 is a reference point between SMF and PCF.
N8 is a reference point between UDM and AMF.
N9 is a reference point between UPFs.
N10 is a reference point between UDM and SMF.

N11 is a reference point between AMF and SMF.
N12 is a reference point between AMF and AUSF.
N13 is a reference point between UDM and AUSF.
N14 is a reference point between AMFs.
N15 is a reference point between PCF and AMF.
N16 is a reference point between SMFs.
N22 is a reference point between AMF and NSSF.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC) layer. The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The non-access stratum (NAS) layer performs functions such as connection management (session management) and mobility management.

The NAS layer is divided into a NAS entity for mobility management (MM) and a NAS entity for session management (SM).

1) NAS entity for MM provides the following functions in general.
  NAS procedures related to AMF include the following.
  Registration management and access management procedures. AMF supports the following functions.
  Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
  The NAS entity for the MM creates a NAS-MM message that derives how and where to deliver an SM signaling message through a security header representing the NAS transmission of SM signaling and additional information on a received NAS-MM.

Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

Network systems (i.e., 5GC) for next-generation mobile communications (i.e., 5G) also support non-3GPP access. An example of the non-3GPP access is WLAN access. The WLAN access may include both trusted and untrusted WLANs.

In systems for 5G, AMF performs registration management (RM) and connection management (CM) for non-3GPP access as well as 3GPP access.

The UE may perform handover in order to use the PDU session, which is created in the trusted non-3GPP access, in the 3GPP access. To this end, the UE may perform a handover operation including a special PDU session ID used in trusted non-3GPP access. However, when the terminal does not support the NAS layer signal in the non-3GPP access, there is a problem in that a technique for handover of the PDU session used in the 3GPP access to the trusted non-3GPP access is not presented.

SUMMARY

Accordingly, an object of the present disclosure is to propose a method for solving the above-described problems.

In order to solve the above problems, one disclosure of the present specification provides a user equipment (UE) for establishing a protocol data unit (PDU) session. The UE includes a transceiver; and a processor controlling the transceiver. The processor is configured to perform: determine whether a possibility that the PDU session is to be handed over to non-3rd Generation Partnership Project (non-3GPP) access exists; determining an ID of the PDU session according to the determination; and transmit a message including the determined ID of the PDU session may be performed.

The processor may further perform: receive, by the UE, information about a PDU session available in the non-3GPP access from the network. Wherein the ID of the PDU session may be determined based on the received information on the PDU session.

The message may be a PDU session establishment request message.

The PDU session establishment request message may include a request type set to "existing PDU session" or "initial request".

The message may be an Extensible Authentication Protocol (EAP) message.

The EAP message may further include one or more of: a data network name (DNN), Session Network Slice Selection Assistance Information (S-NSSAI), and a request type.

The EAP message including the ID of the PDU session may be used to cause the network to generate a PDU session establishment request message on behalf of the UE.

In order to solve the above problems, one disclosure of the present specification provides a Trusted WLAN Interworking Function (TWIF) node. The TWIF node includes a transceiver; and a processor controlling the transceiver. The processor is configured to perform: receive an Extensible Authentication Protocol (EAP) message including an ID of a Protocol Data Unit (PDU) session from a user equipment (UE), generate a PDU session establishment request message based on the PDU session ID in the received EAP message; and transmitting the generated PDU session establishment request message to an Access and Mobility Management Function (AMF) node.

The PDU session establishment request message may include a request type set to "existing PDU session" or "initial request".

The EAP message may further include one or more of a data network name (DNN), Session Network Slice Selection Assistance Information (S-NSSAI), and a request type.

When the EAP message does not include a request type, the request type in the generated PDU session establishment request message may be configured to be "initial request".

In order to solve the above problems, one disclosure of the present specification provides an Access and Mobility Management Function (AMF) node. The AMF node includes a transceiver; And it may include a processor for controlling the transceiver. The processor receives a message including a protocol data unit (PDU) session ID and a request type from TWIF, and a PDU session establishment request is performed based on the PDU session ID in the received message. The step of determining whether or not and based on the determination, the step of transmitting the received PDU session establishment request message to a Session Management Function (SMF) node may be performed.

In order to determine that the PDU session establishment request is a handover, the processor may check whether the ID of the same session is in 3GPP access.

If it is determined that the handover is the handover, the processor may set a request type in the PDU session establishment request message to "existing PDU session" and transmit it.

According to the disclosure of the present specification, it is possible to solve the problems of the prior art.

DETAILED DESCRIPTION OF THE EMBODIMENTS

Figure 1:
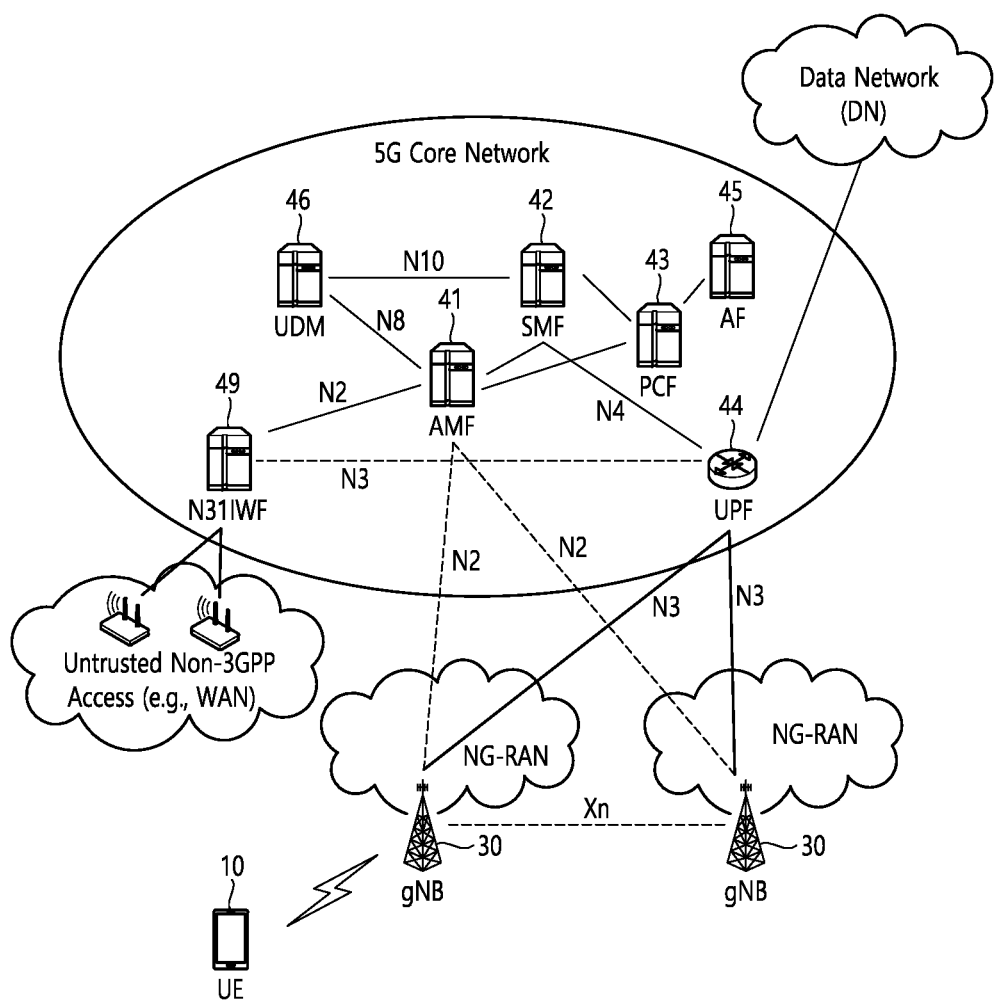
FIG. 1 is a structural diagram of a next-generation mobile communication network.
Figure 2:
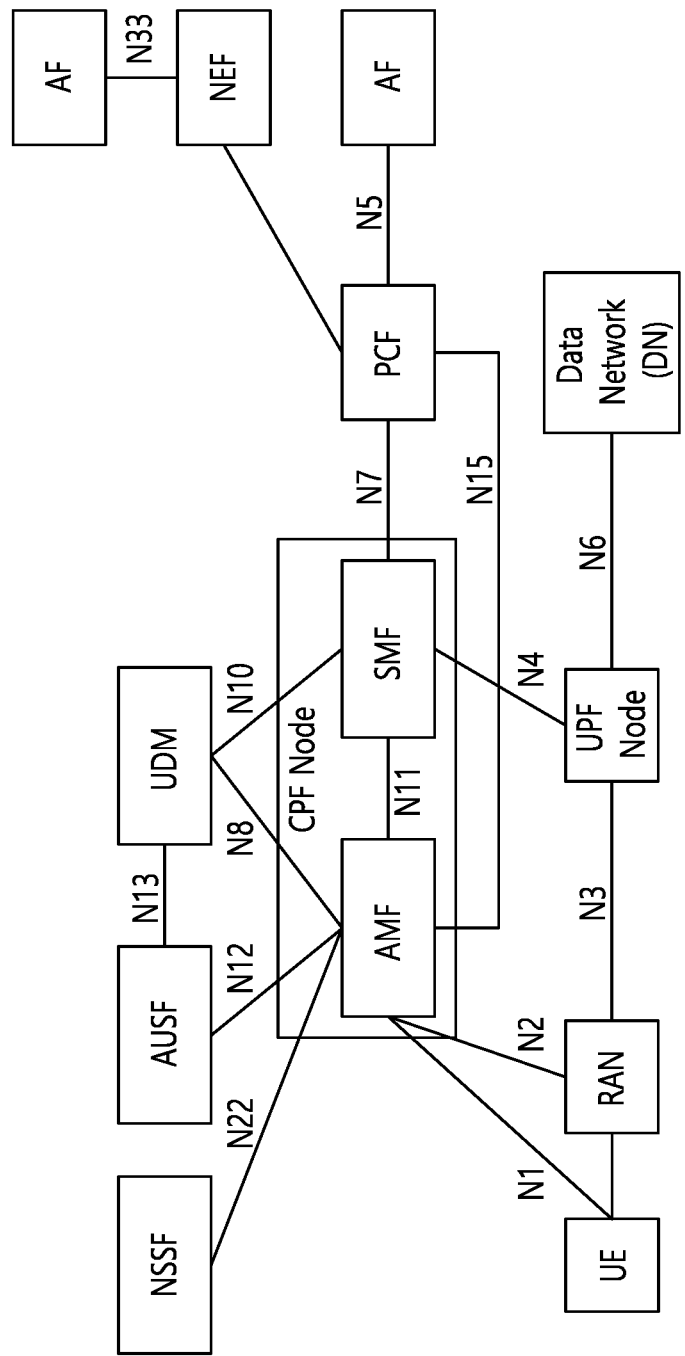
FIG. 2 is an exemplary diagram illustrating a predicted structure of a next generation mobile communication in terms of a node.
Figure 3:
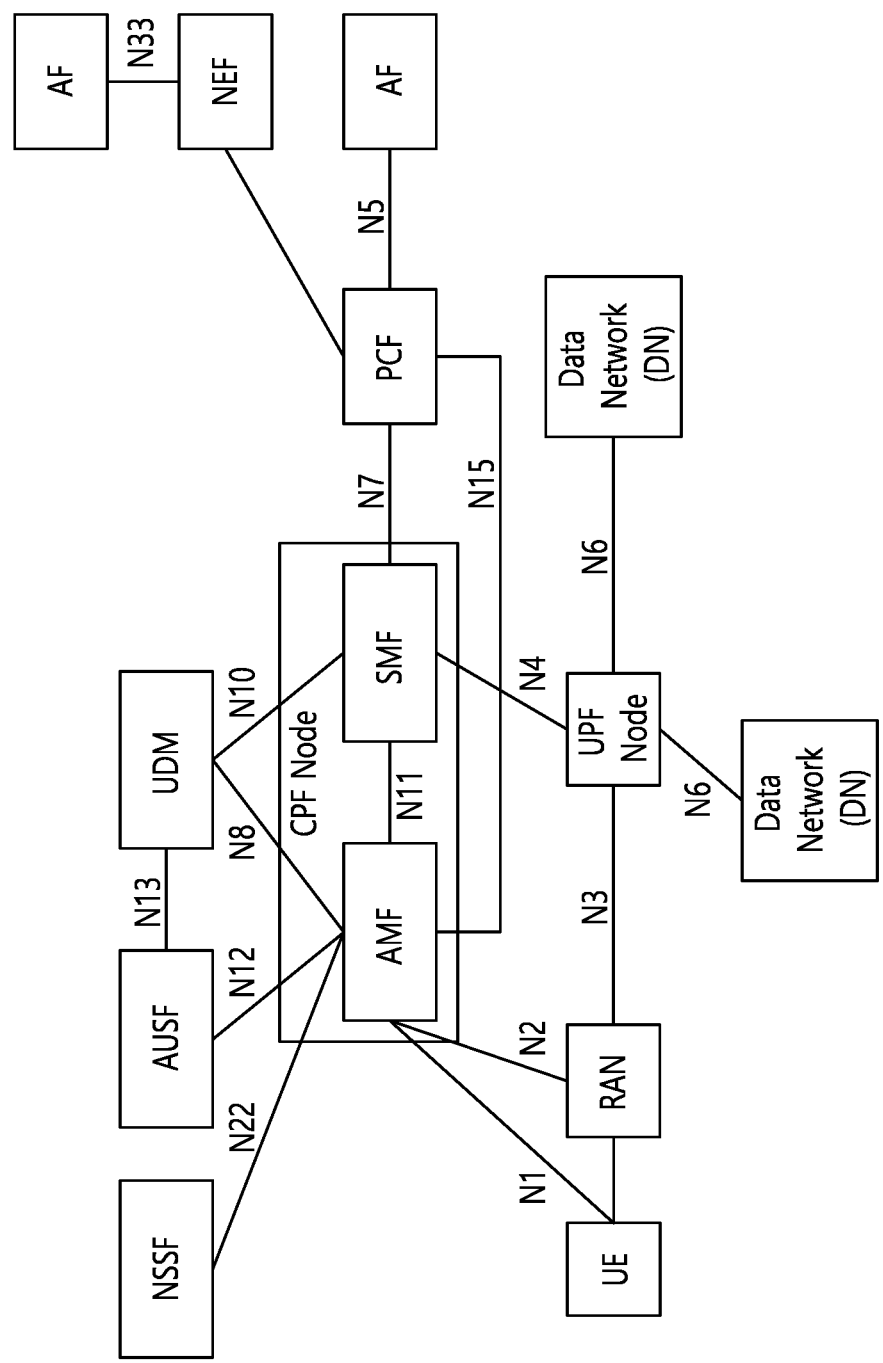
FIG. 3 is an exemplary diagram illustrating an architecture for supporting simultaneously access two data networks.
Figure 4:
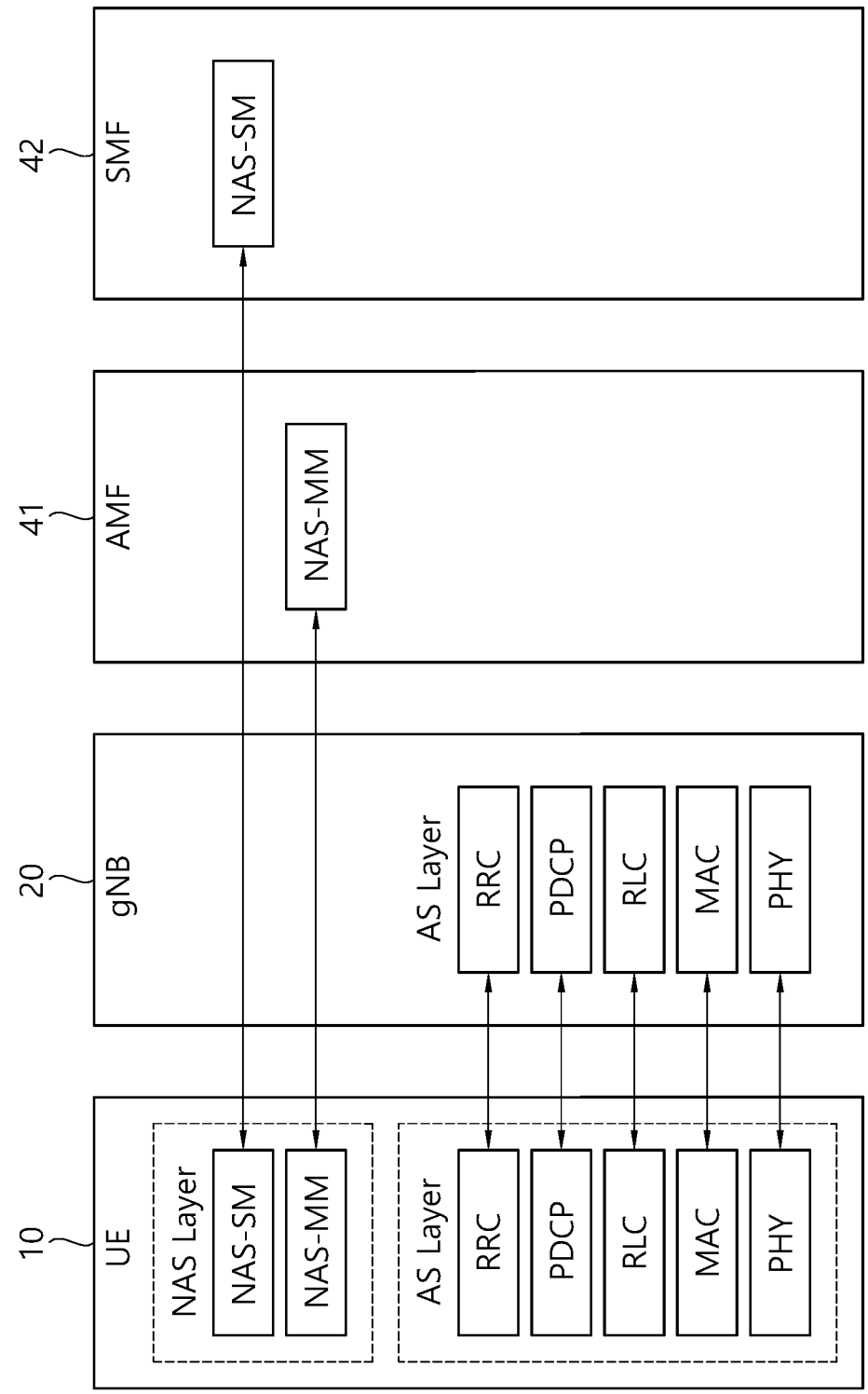
FIG. 4 is another exemplary diagram showing a structure of a radio interface protocol between a UE and a gNB.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new tracking area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 5A:
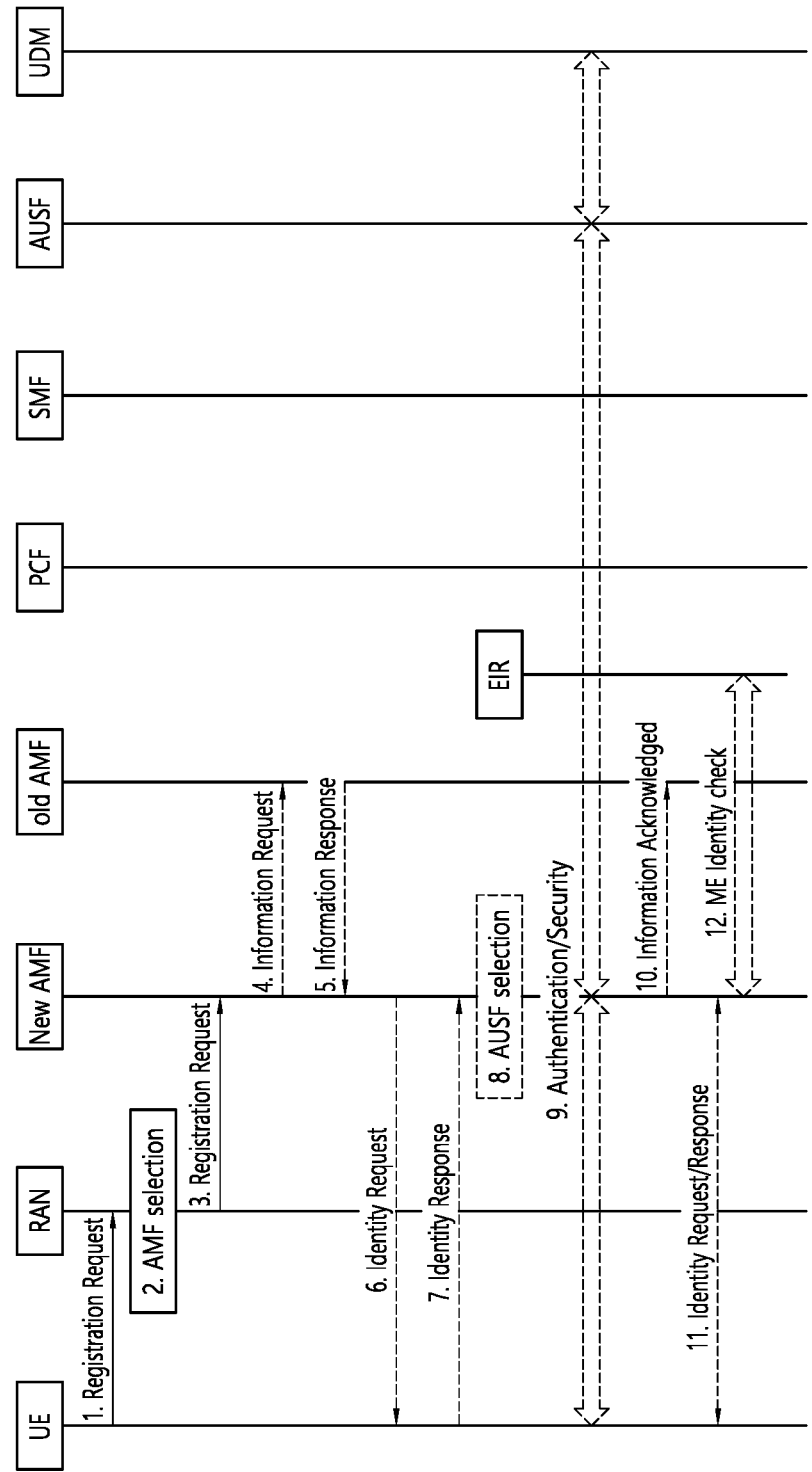
FIGS. 5a and 5b are a signal flowchart illustrating an exemplary registration procedure.
Figure 5B:
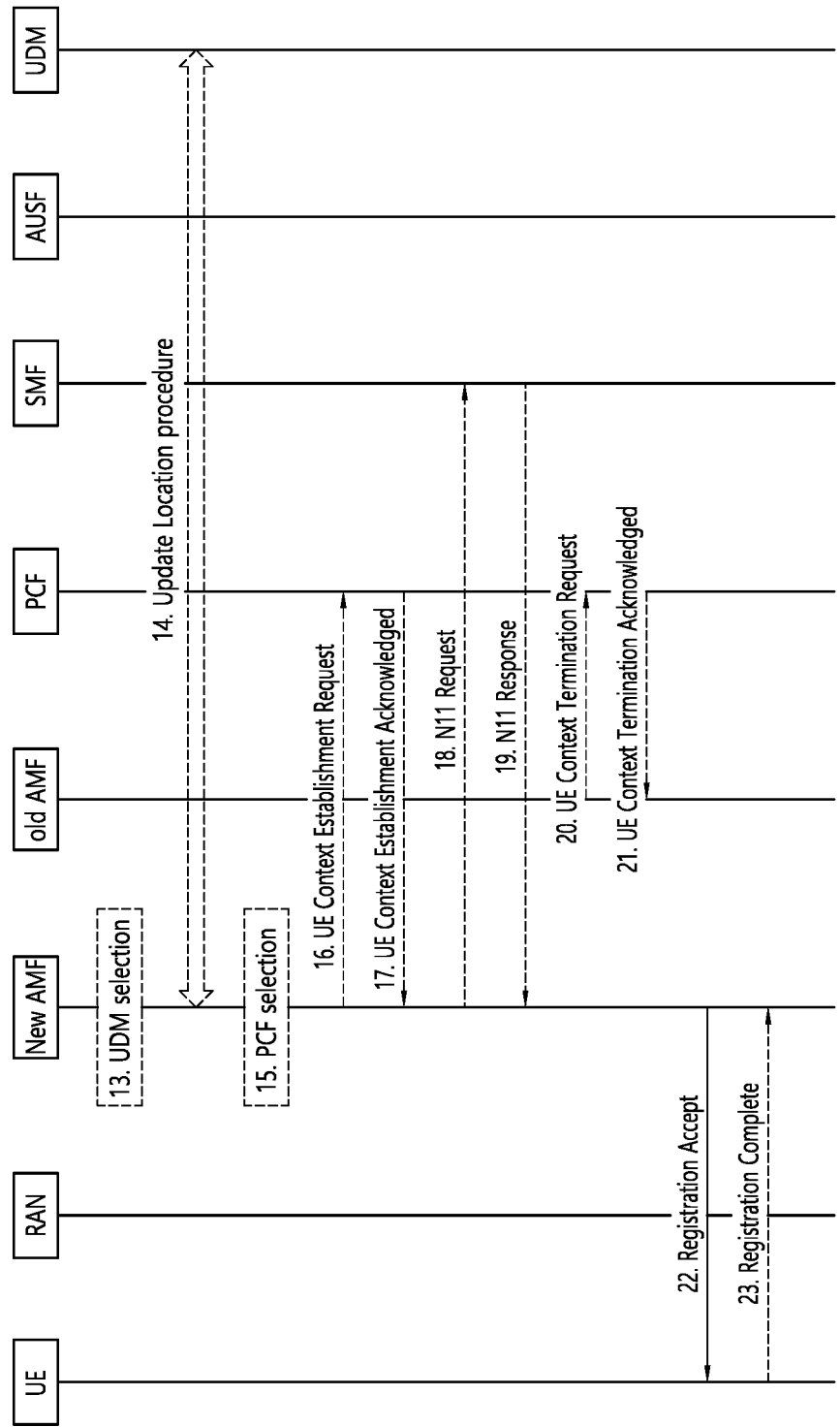

FIGS. 5a and 5b are a signal flowchart illustrating an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NSSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information on the allowed NSSAI and the mapped NSSAI. The information on the allowed NSSAI information for the UE's access type may be contained within N2 messages containing the registration accept message. The information on the mapped NSSAI is information for mapping each S-NSSAI of the allowed NSSAI to the S-NASSI of the NSSAI set up for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session

Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6A:
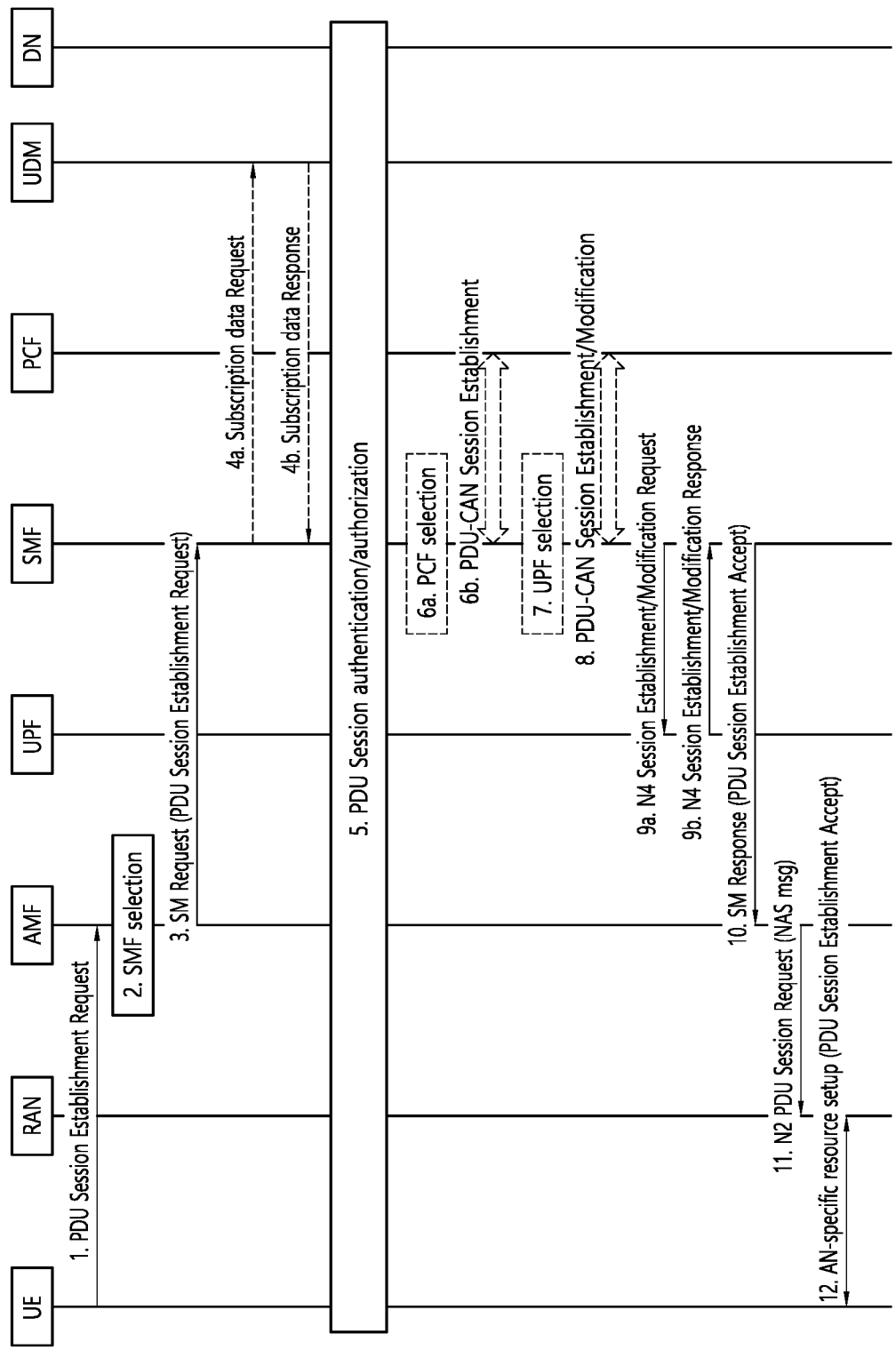
FIGS. 6a and 6b are a signal flowchart illustrating an exemplary PDU session establishment procedure.
Figure 6B:
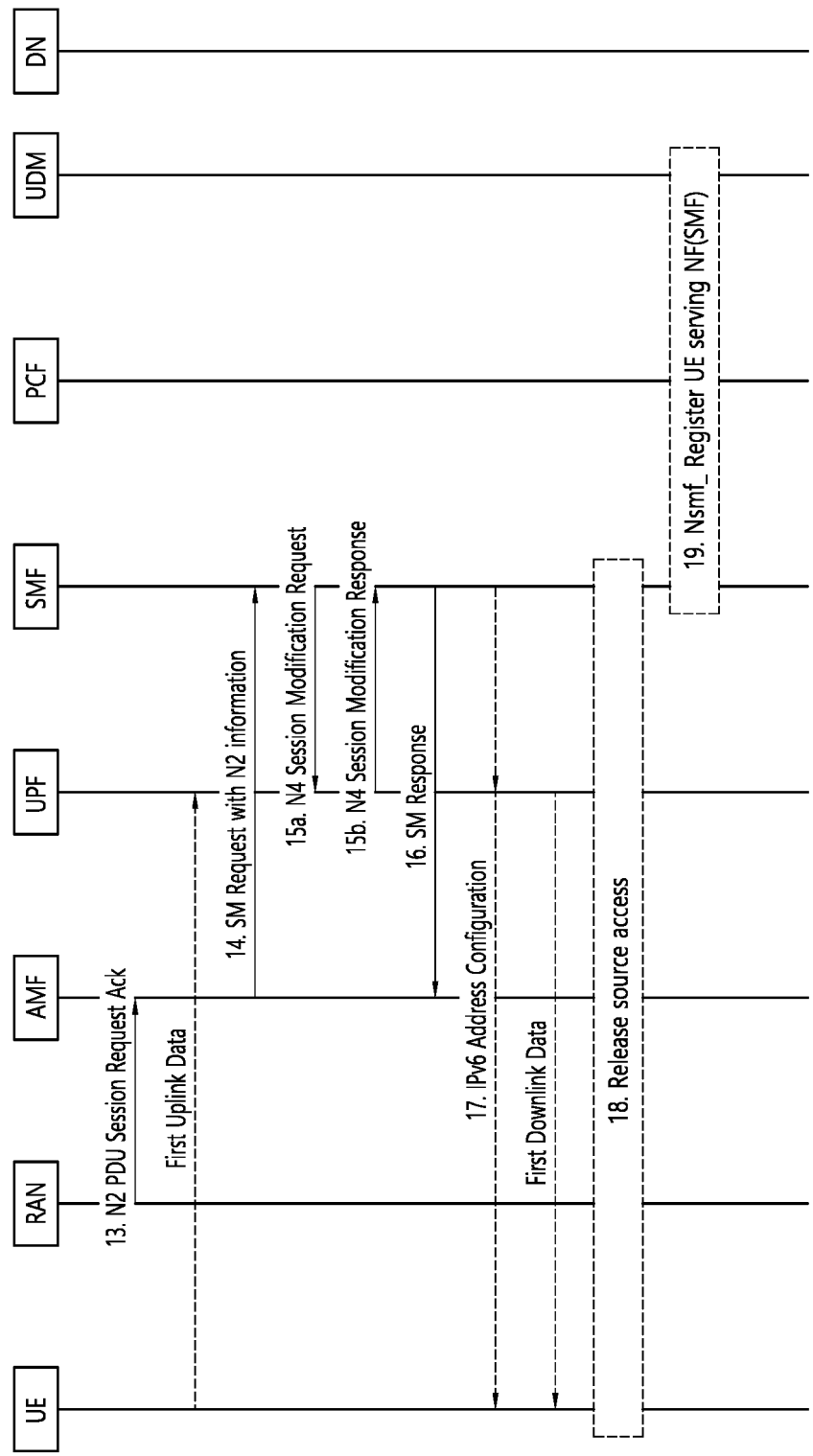
Figure 7A:
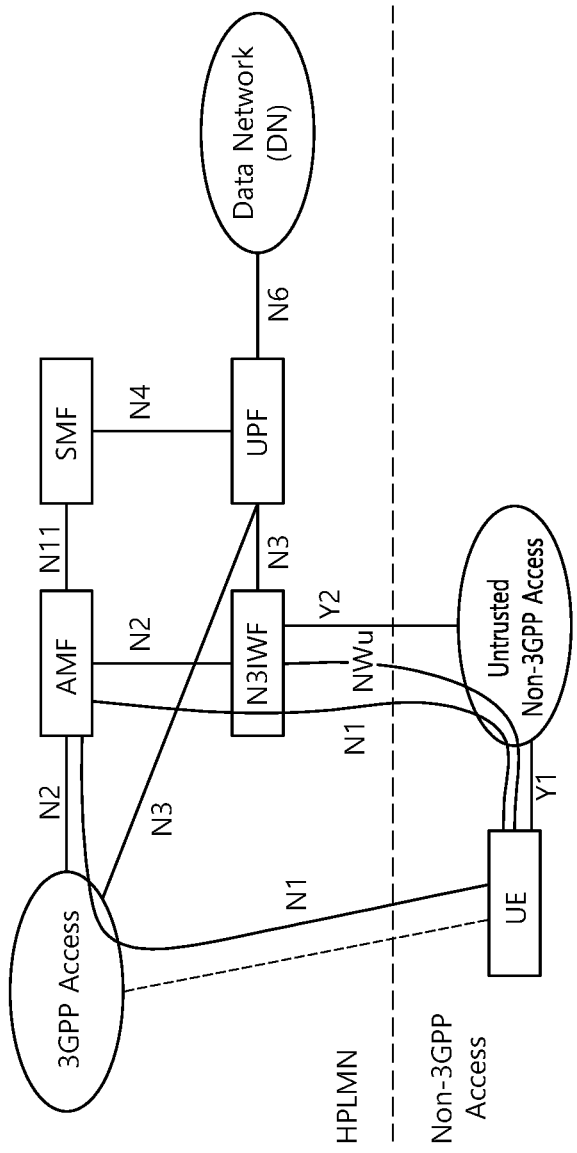
FIG. 7a to FIG. 7f illustrate architectures for bypassing data to the non-3GPP network.
Figure 7B:
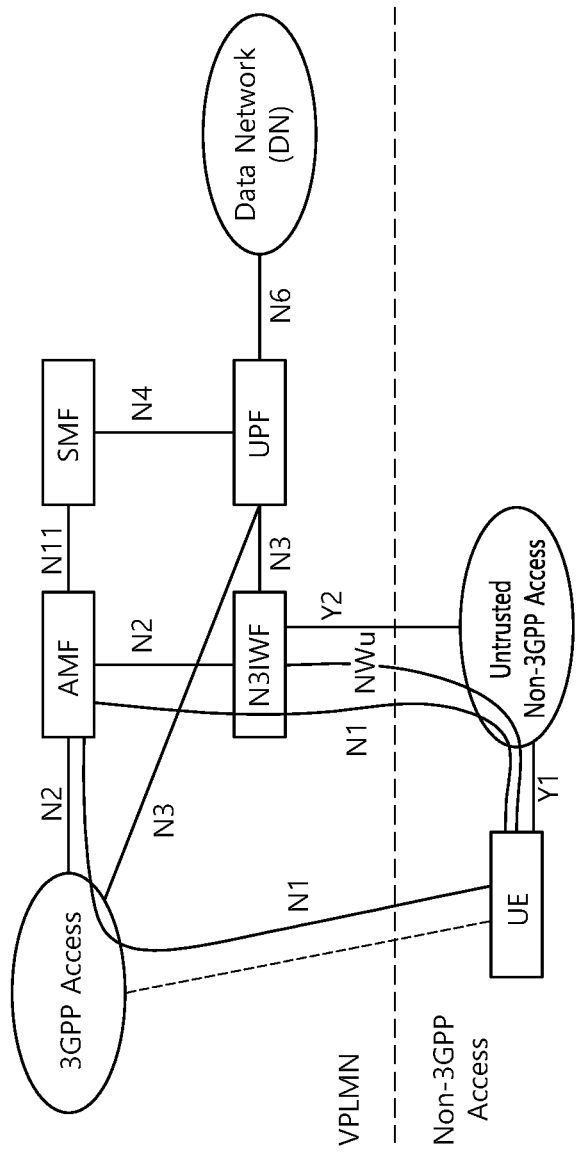
Figure 7C:
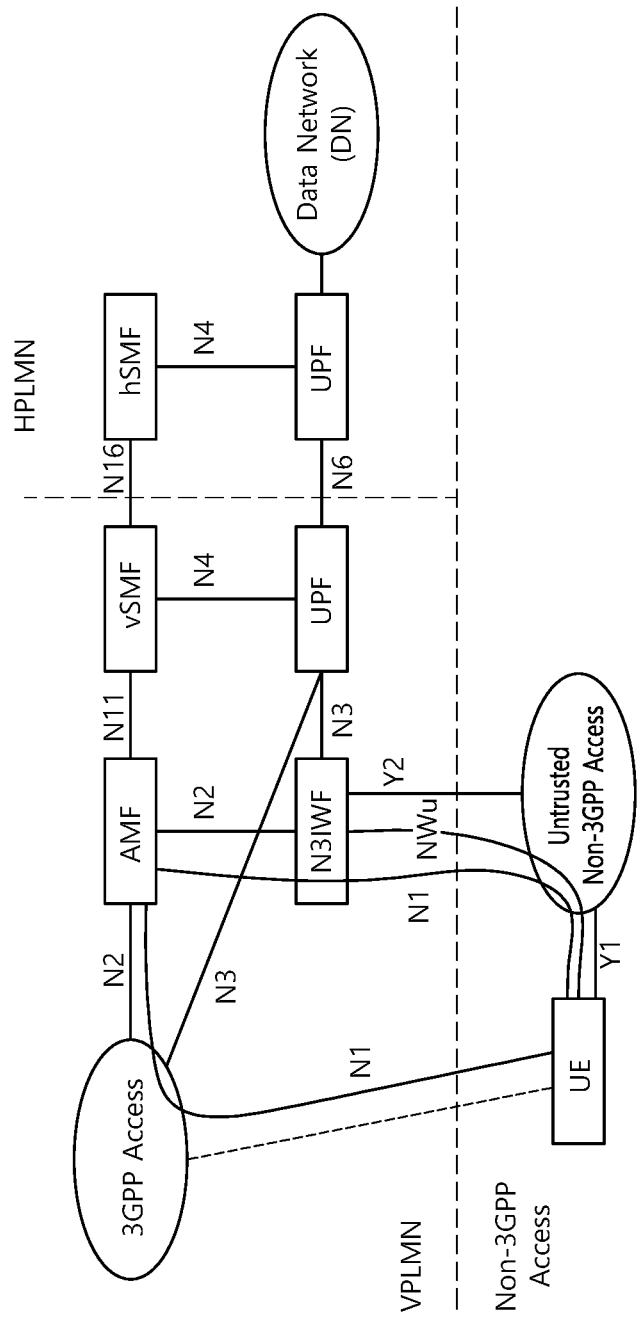
Figure 7D:
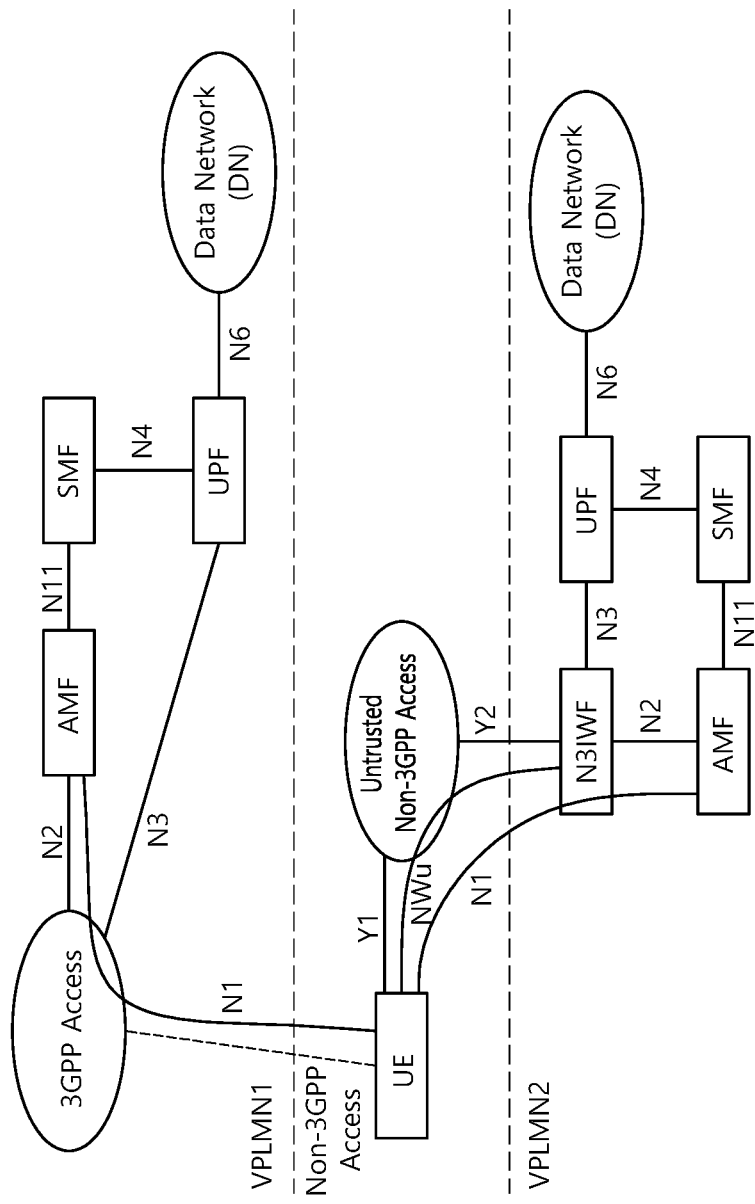
Figure 7E:
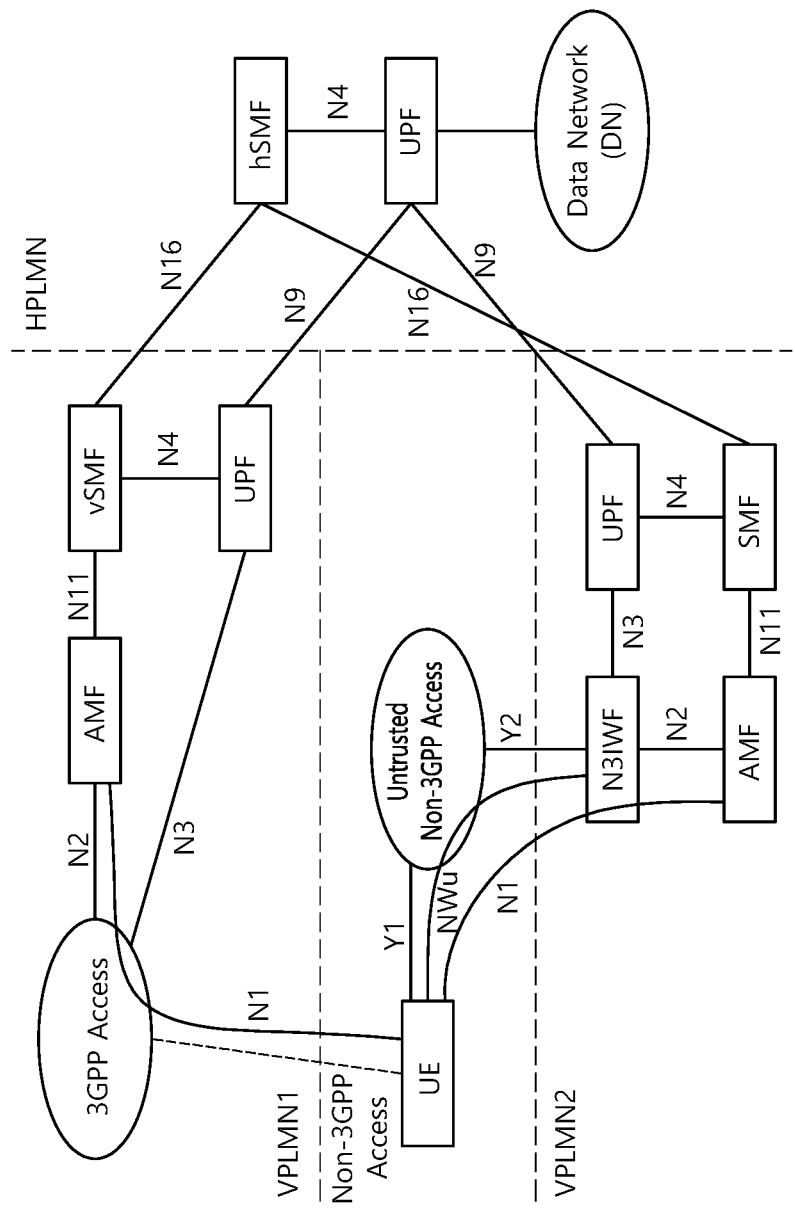
Figure 7F:
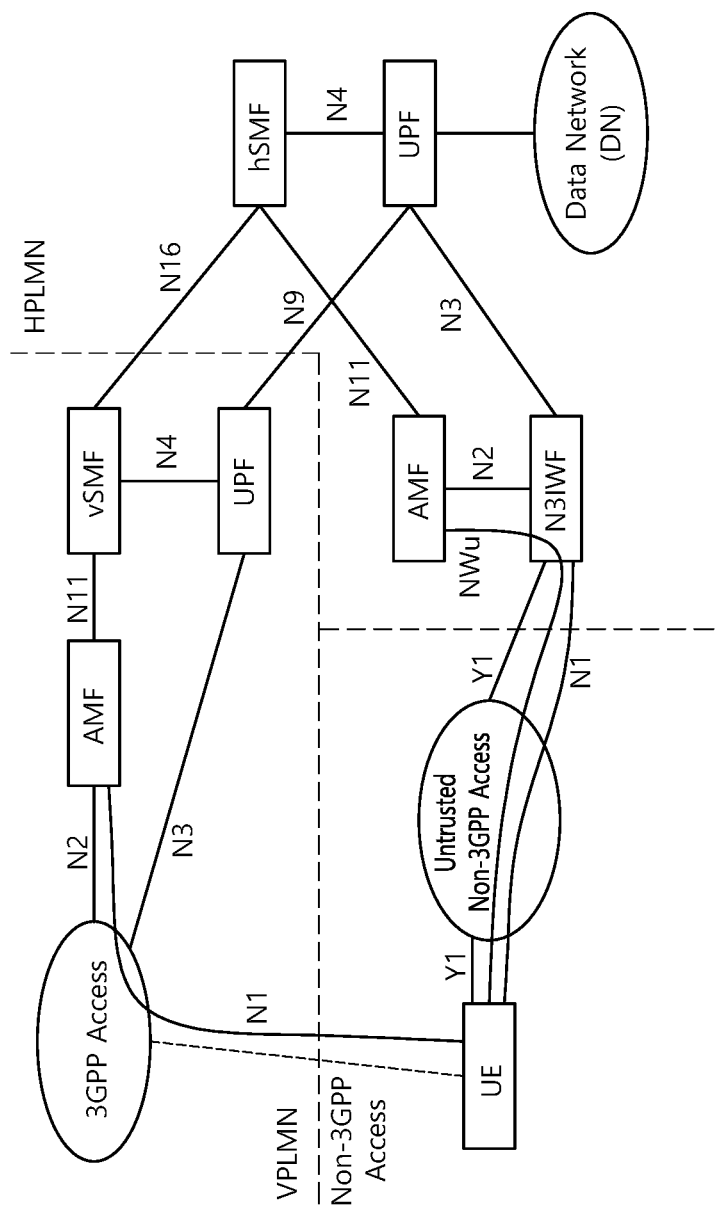

FIGS. 6a and 6b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information, and so on.

Specifically, the UE includes S-NSSAI from allowed NSSAI for the current access type. If information on the mapped NSSAI has been provided to the UE, the UE may provide both S-NSSAI based on the allowed NSSAI and the corresponding S-NSSAI based on the information on the mapped NSSAI. Here, the information on the mapped NSSAI is information on mapping of each S-NSSAI in the allowed NSSAI to the S-NASSI in the NSSAI set up for HPLMN.

More specifically, the UE may extract and store the allowed NSSAI and the information on the mapped NSSAI, included in the registration accept message received from the network (i.e., AMF) in the registration procedure shown in FIG. 5. Therefore, the UE may transmit by including both S-NSSAI based on the allowed NSSAI and the corresponding S-NSSAI based on the information on the mapped NSSAI in the PDU session establishment request message.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM Register UE serving NF service" including an SMF address and DNN. The UDM may store the ID, address, and DNN of the SMF.

During the procedure, if the PDU Session Establishment is not successful, the SMF notifies this to the AMF.

<Data Bypass to Non-3GPP Network>

In the next generation mobile communication, the data of the UE may bypass to a non-3GPP network, for example, a Wireless Local Area Network (WLAN) or Wi-Fi.

FIG. 7a to FIG. 7f illustrate achitectures for bypassing data to the non-3GPP network.

The Wireless Local Area Network (WLAN) or Wi-Fi is regarded as the untrusted non-3GPP network. In order to access the non-3GPP network to a core network, a Non-3GPP InterWorking Function (N3IWF) may be added.

Problem to be Solved Through the Disclosure of the Present Specification

Figure 8:
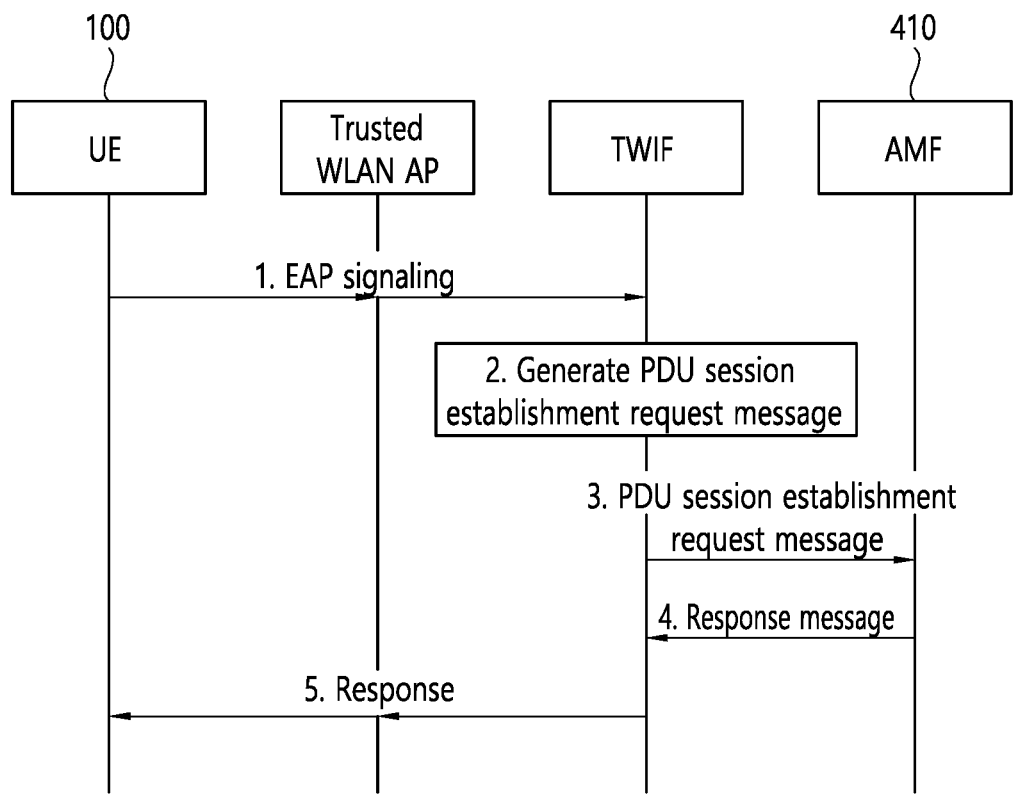
FIG. 8 illustrates a process in which a PDU session is established when the UE performs registration via a trusted non-3GPP access.
Figure 9A:
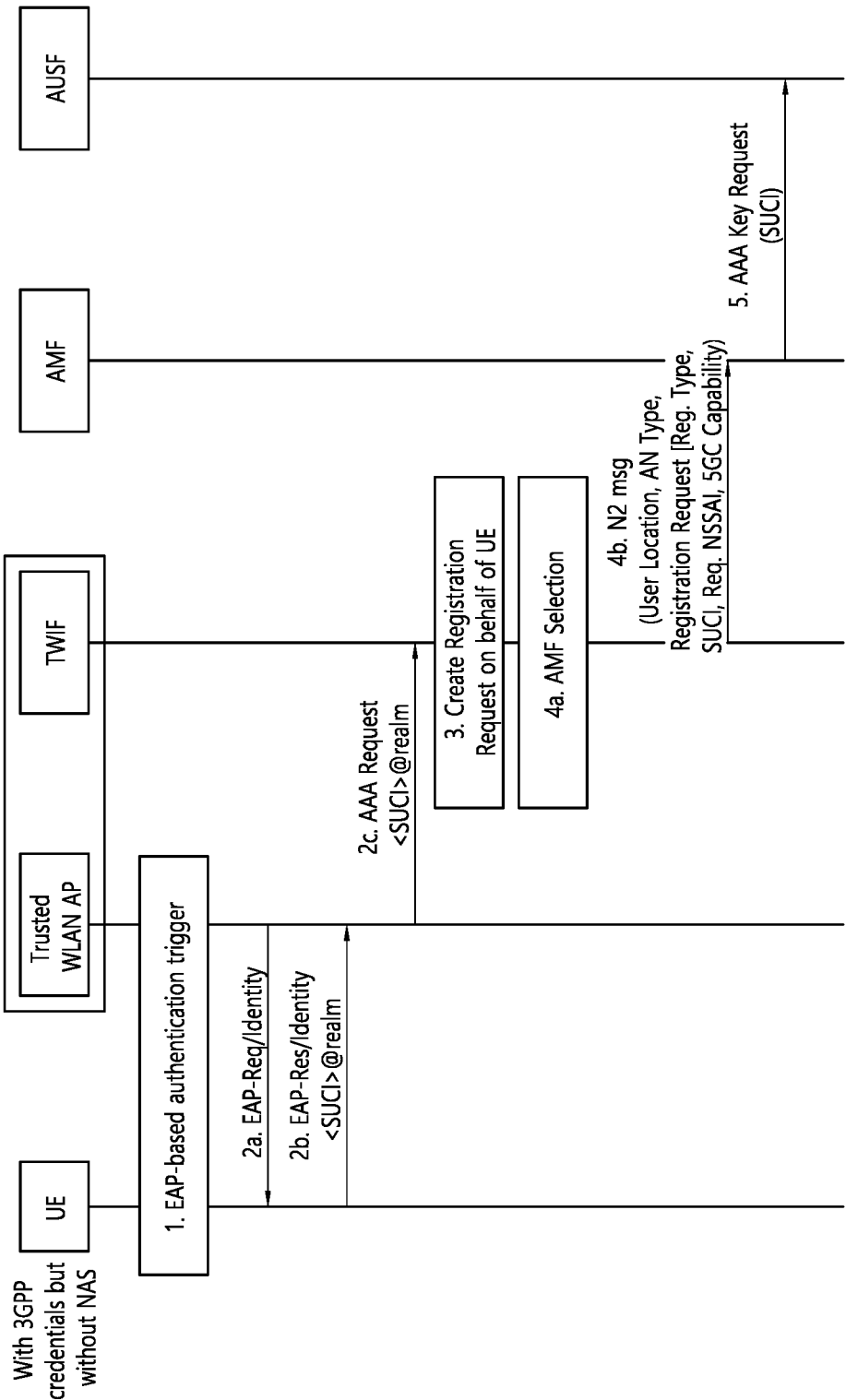
FIG. 9a to FIG. 9d is a flowchart illustrating a procedure according to one disclosure of the present specification.
Figure 9B:
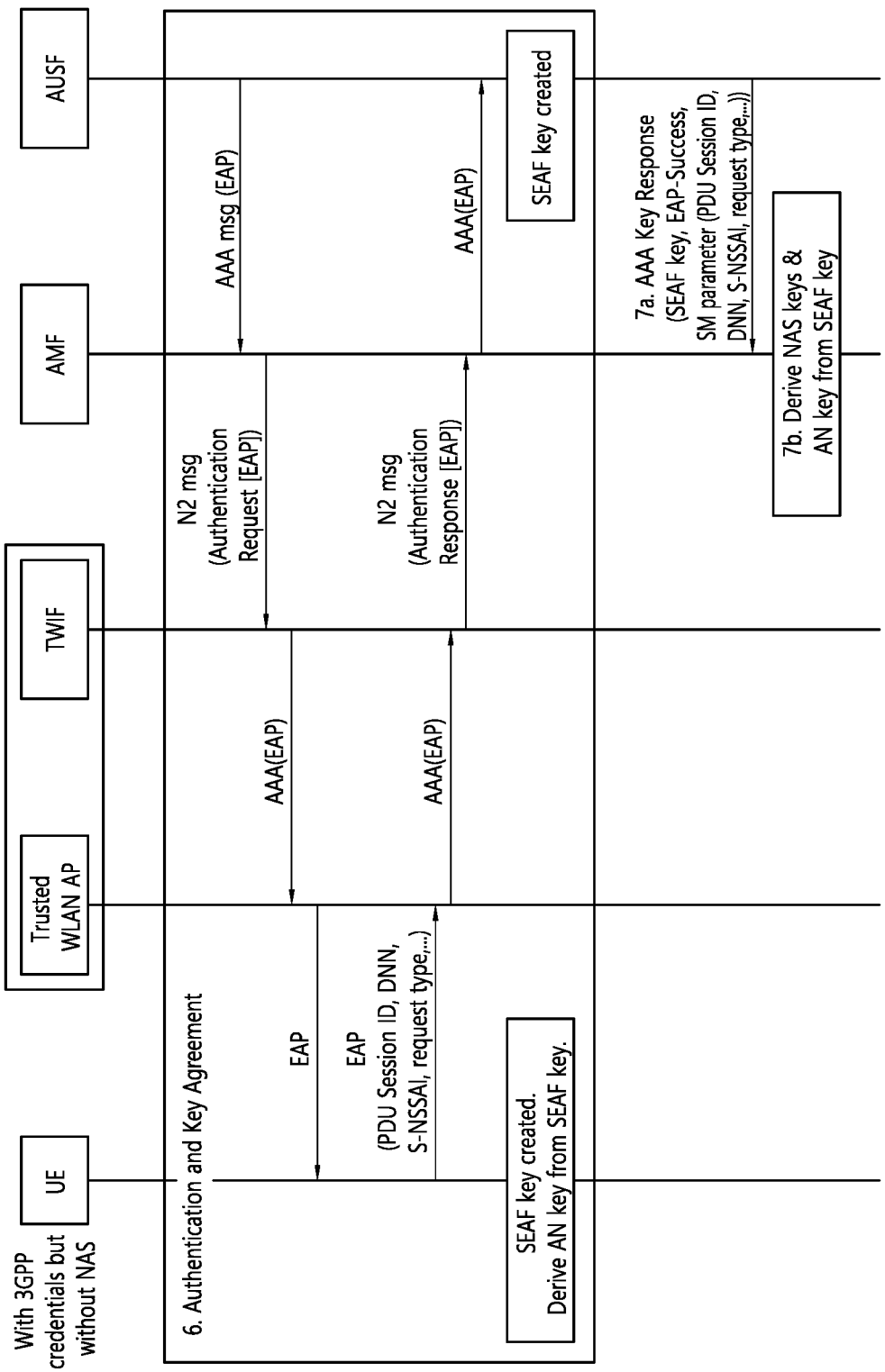
Figure 9C:
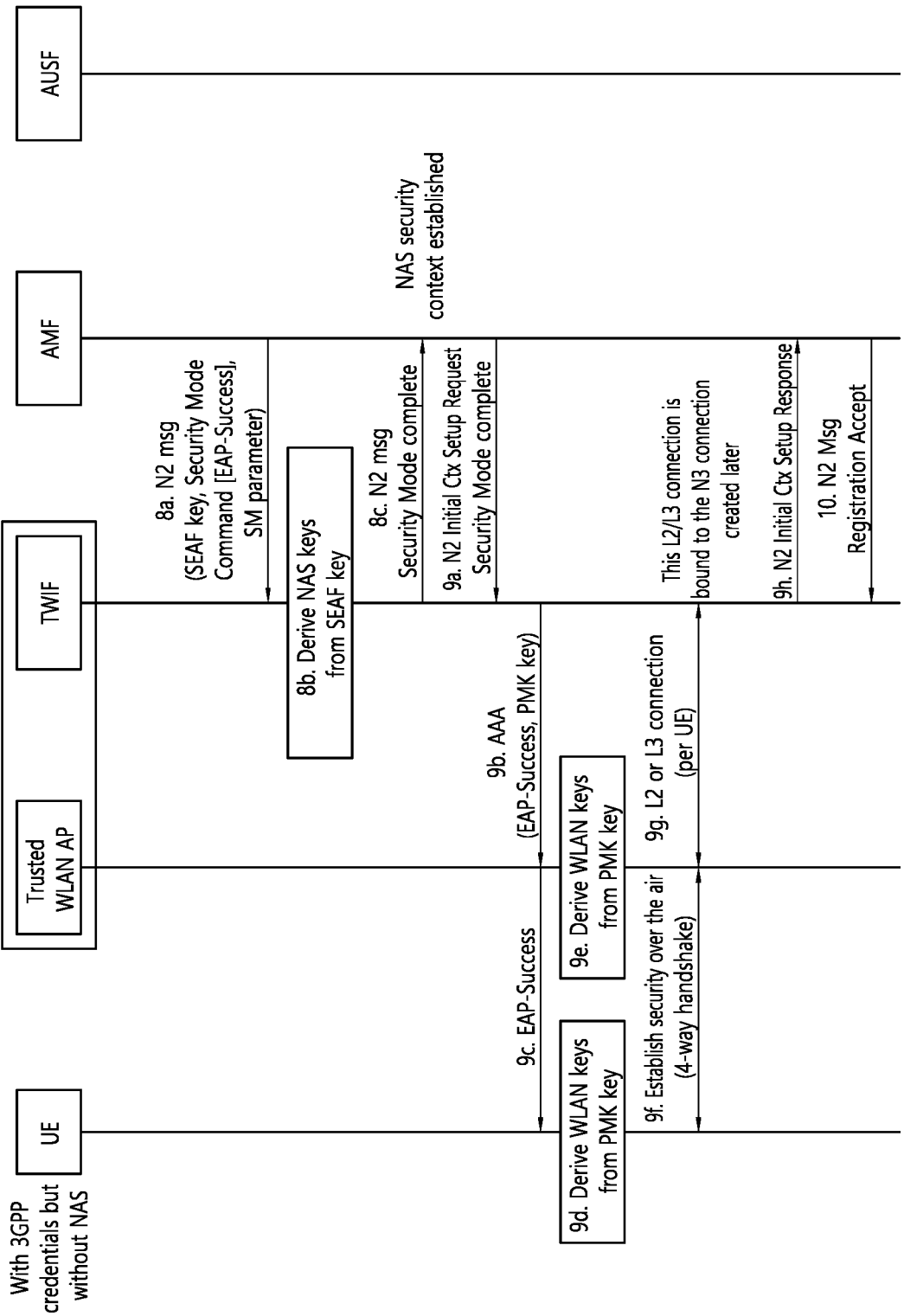
Figure 9D:
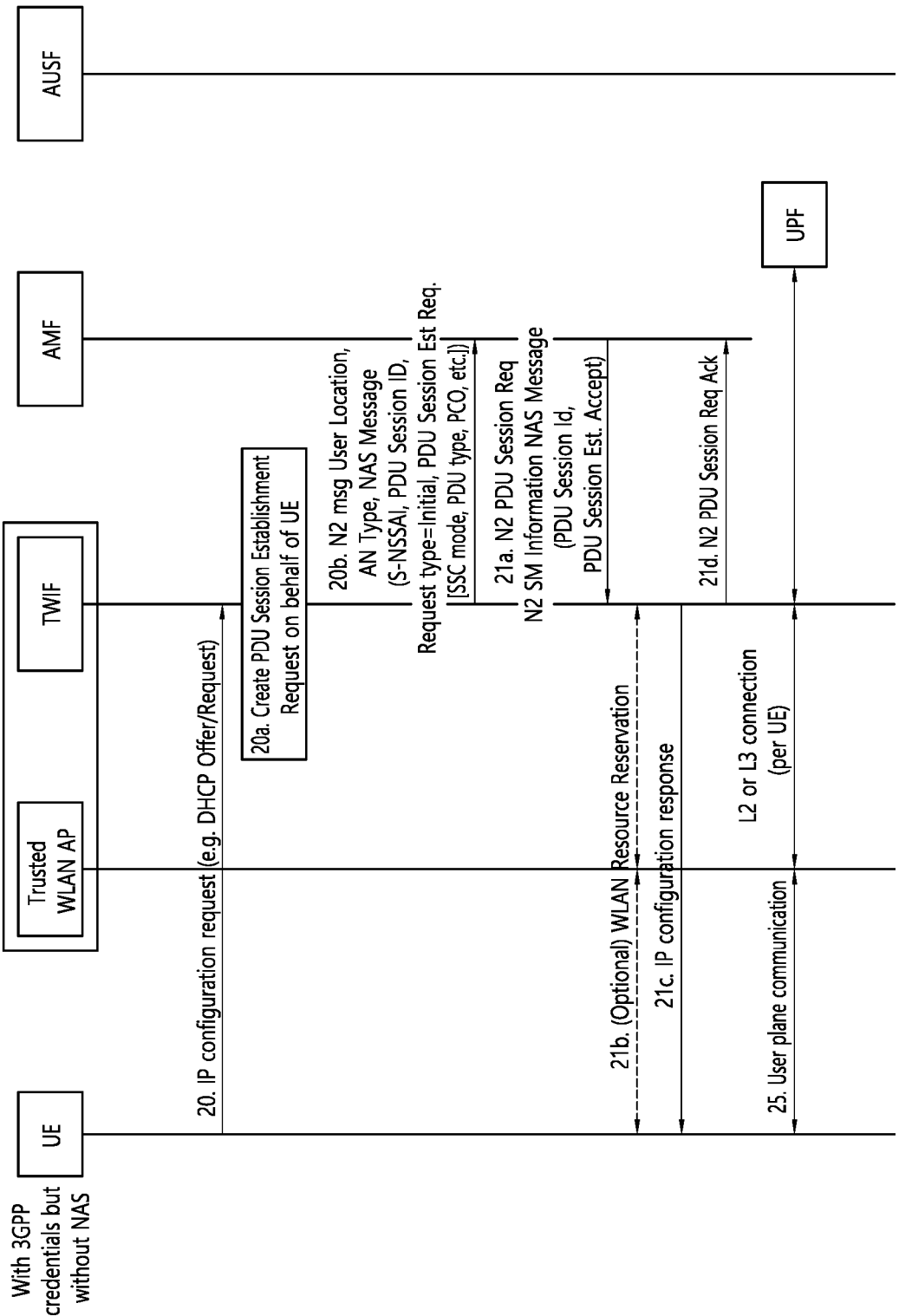

FIG. 8 illustrates a process in which a PDU session is established when the UE performs registration via a trusted non-3GPP access.

The UE 100 may not support signaling of the NAS layer when using non-3GPP access. Therefore, the UE cannot transmit the message of the NAS layer.

Instead, the UE 100 performs registration with the TWIF by sending Extensible Authentication Protocol (EAP) signaling to a Trusted WLAN Interworking Function (TWIF) via a trusted non-3GPP access.

After TWIF processes the registration of the UE, the TWIF directly generates a PDU session establishment message without exchanging additional messages with the UE in order to create a PDU session for the UE and transmits the PDU session establishment message to the AMF/SMF.

In this case, TWIF uses the PDU session ID of a specific value determined by the operator or standard. In this process, TWIF may use pre-configured values for some parameters (eg, DNN, SSC Mode, PDU Session Type, etc.) for PDU session creation. Alternatively, TWIF may send a message without providing any parameters so that the AMF and/or SMF directly may use a value based on the subscriber information. Therefore, the UE can only have one PDU session via the trusted non-3GPP access.

The UE may perform handover in order to use the PDU session created in the trusted non-3GPP access in the 3GPP access. To this end, the UE may perform a handover operation including a special PDU session ID used in trusted non-3GPP access. However, when the UE does not support the NAS layer signal, there is a problem in that a technique for handover of a PDU session used in 3GPP access to a trusted non-3GPP access is not presented.

Disclosure of the Present Specification

The disclosure of this specification proposes a scheme for handover between 3GPP access and trusted non-3GPP access.

The disclosure of the present specification may be implemented by one or more combinations of the following configurations. In the case of the embodiment below, an embodiment is shown to show each individual configuration, but an embodiment in which one or more combinations are configured together may be implemented.

I. First Disclosure: A Method of Using a Specific PDU Session ID

In this method, when the UE wants to transfer the PDU session established in 3GPP access to non-3GPP access that is trusted in the future, in the process of establishing the PDU session in 3GPP access, the PDU session is established based on the PDU session ID (eg, 255) that can be used in trusted non-3GPP access. That is, the UE must establish a PDU session in 3GPP access based on a PDU session ID that can be used in trusted non-3GPP access.

To this end, the network may provide the UE with information about sessions available in trusted non-3GPP. Specifically, the network may deliver the information to the UE through a UE Route Selection Policy (URSP) rule. For example, the network may transmit a trusted non-3GPP access value by including a trusted non-3GPP access value in the Access Type preference in the Route Selection Descriptor of the URSP rule. Before requesting a PDU session based on the USRP rule, the UE determines whether the requesting PDU session is a PDU session that can be transferred to a trusted non-3GPP access or not, and then determines a PDU session ID.

When the UE transmits a PDU session establishment request message including a PDU session ID usable only for trusted non-3GPP access (excluding a case that the message includes an "existing PDU session" indication, that is, a case that the UE wants to perform handover), the AMF must determine whether a PDU session having the corresponding PDU session ID already exists. At this time, the AMF determines this based on the context, which the AMF has.

In the process that a PDU session is created, the AMF stores the PDU session ID and SMF address information. Also, even when the UE performs registration through different PLMNs in both 3GPP access and non-3GPP access, the AMFs of both PLMNs store PDU session ID-SMF address information for PDU sessions of all PLMNs. Therefore, the AMF checks the PDU session ID for PDU sessions created in different PLMNs based on this information. If the AMF determines that a PDU session having a PDU session ID used only for trusted non-3GPP access already exists, the AMF may reject the UE's request. Alternatively, the AMF may deliver an indication indicating that there is a PDU session having the same PDU session ID while delivering the PDU session establishment request message from the UE to the SMF. When the SMF receives the corresponding indication from the AMF, the SMF may reject the UE's request.

Since the UE using the trusted non-3GPP access does not support signaling of the NAS layer, TWIF may generate a message of the NAS layer on behalf of the UE and transmit TWIF the message of the NAS layer to the AMF. Therefore, the UE cannot transmit information about the PDU session, to which the handover is to be performed, to the network.

When the request type in the received request message is "exiting PDU session", the AMF recognizes that the received request message is for a handover request, the AMF finds an SMF that manages the PDU session, and the AMF transmits a PDU session establishment request message to the SMF. However, in a situation in which the TWIF generates and transmits a message of the NAS layer on behalf of the UE, the TWIF does not know which access the PDU session is associated with, so TWIF transmits the message of the NAS layer with a Request type in the message of the NAS layer is set as "initial request". Therefore, even if TWIF sets the request type in the message to "initial request" and TWIF transmits the message to AMF, if a PDU session with a special PDU session ID used only for trusted non-3GPP access is already created in 3GPP access, AMF determines that the message is a message for a handover request from 3GPP access to trusted non-3GPP access, AMF updates the access type information of the PDU session to non-3GPP, and AMF transmits a PDU session establishment request message to the corresponding SMF. In this case, the AMF may transmit the message by setting the request type information in the corresponding message to "existing PDU session". Alternatively, the AMF transmits the request type information in the corresponding message without modifying the request type information, but the SMF may determine that it is a handover request for a PDU session created in 3GPP access based on a special PDU session ID. In this case, the SMF transmits a message to the AMF to update the access type of the corresponding PDU session to non-3GPP.

The UE does not receive any NAS messages even if the PDU session is handed over. Therefore, if registration is successfully performed in trusted non-3GPP access, the UE determine that the PDU session having a specific PDU session ID has been successfully handed over, and the UE update the associated access of the PDU session to non-3GPP.

When using this first disclosure, if the UE performs registration for trusted non-3GPP access without transmitting additional signaling, handover to trusted non-3GPP access is automatically performed.

II. Second Disclosure: A Method for Transmitting Signaling Through an EAP Message The method according to the second disclosure is a method in which the UE directly informs which PDU session to handover through trusted non-3GPP access. This section assumes that the UE does not support NAS layer signaling in non-3GPP access. Therefore, in this section, it is proposed that the UE informs the TWIF of the PDU session ID to which the UE intends to perform handover through the EAP message. Upon receiving the EAP message including the PDU session ID that is the handover target, the TWIF generates a PDU session establishment request message for handover and transmits the PDU session establishment request message to the AMF.

A method for the UE to provide PDU session information to perform handover through the EAP message follows the EPC S2a with SCM procedure. The UE may transmit PDU session information to perform handover in an EAP message while performing registration or re-registration for trusted non-3GPP access. At this time, the UE sends all information necessary for establishing a PDU session, such as a PDU session ID and parameters to perform handover, such as a data network name (DNN) and Session Network Slice Selection Assistance Information (S-NSSAI), etc. Alternatively, the UE may insert only PDU session ID information in the EAP message and the UE transmits the EAP message.

II-1. If the UE Transmits Other Parameters (Eg, DNN, S-NSSAI, Request Type) with the PDU Session ID Upon receiving this, the TWIF generates a PDU session establishment request message according to the information sent by the UE and the TWIF transmits the PDU session establishment request message to the AMF. In this case, the request type of the PDU session establishment request message is set to be the same as the value sent by the UE. AMF forwards the message transmitted by TWIF to SMF.

II-2. If the UE Transmits Only the PDU Session ID

TWIF generates a PDU session establishment request message based on the PDU session ID sent by the UE and TWIF transmits it to the AMF. Since the TWIF has no information about whether the UE has requested a handover, the TWIF may set the request type is "initial request". The AMF sets the request type in the PDU session establishment request message to "existing PDU session" or "initial request" according to the PDU session ID information (according to whether the same PDU session ID exists for 3GPP access). Then, the AMF transmits the PDU session establishment request message. At this time, if the request type is set to "existing PDU session", the access related to the corresponding PDU session ID is changed to non-3GPP.

If the SMF rejects the handover, the TWIF creates a new PDU session using preset information instead of transmitting a PDU session establishment request message based on the PDU session ID requested by the UE. In this case, a PDU session is created using a special PDU session ID used only for trusted non-3GPP access. When the UE receives the EAP-Success, the UE determines that the handover is successful and updates the associated access for the corresponding PDU session to non-3GPP.

FIG. 9a to FIG. 9d is a flowchart illustrating a procedure according to one disclosure of the present specification.

1) UE connects to trusted non-3GPP access. An EAP authentication procedure is initiated.

2) UE provides Network Access Identity (NAI). A Trusted WLAN Access Point (TWAP) selects a TWIF and sends an AAA request to the selected TWIF, eg, based on the received realm or based on preset information related to the SSID used by the UE.

For a UE with 5GC capability, the NAI has the format <SUCI>@realm. Here, realm represents a home PLMN (HPLMN). The UE discovers a WLAN supporting 5G connection without NAS signaling and selects a PLMN.

When the UE registers with 5GC through 3GPP access, the NAI may include a 5G-GUTI assigned to the UE on 3GPP access. This allows the TWIF to select the same AMF in a process to be described later.

The NAI provided by the UE may indicate that the UE supports 5G connection without NAS signaling.

3) The TWIF generates a 5GC registration request message on behalf of the UE. The TWIF includes the same parameters in the registration request message to all UEs that do not support 5G NAS. The registration request message may include "Initial Registration".

4) The TWIF selects an AMF using, for example, the 5G-GUTI of the NAI, and transmits an N2 message including the registration request message and location information to the AMF.

5) The AMF triggers an authentication procedure by providing a request indicating an access network (AN) type to the AUSF.

6) EAP authentication (eg, EAP-AKA) is performed between the UE and the AUSF. On the N2 interface, EAP messages are encapsulated in a NAS authentication message and transmitted and received.

Specifically, the UE transmits the PDU session ID and SM parameter information (eg, DNN, S-NSSAI, request type, etc.) in the EAP message during the authentication process. Alternatively, according to the first disclosure, the UE may include only the PDU session ID in the EAP message and transmit the EAP message.

7) After successful authentication, AUSF sends EAP-Success message and generated SEAF key to AMF. The AMF extracts the NAS key and the AN key from the received SEAF key.

In addition, the AUSF extracts SM parameter information (eg, PDU session ID, DNN, S-NSSAI, request type, etc.) from the EAP message and transmits it to the TWIF through the AMF.

8) AMF transmits the Security Mode Command to TWIF, thereby the NAS encryption context between TWIF and AMF is activated. Since TWIF does not have a SEAF key (this key is generated by the UE and AUSF), the message must contain the SEAF key. When it is determined that the N2 interface between the AMF and the TWIF is unsecure, the SEAK key is encrypted and provided to the TWIF.

9) The AMF transmits the N2 initial context setup request message and provides the AN key to the TWIF. Next, the TWIF extracts a Pairwise Master Key (PMK) from the AN key, and transmits the PMK key and the EAP-Success message to the TWAP.

After the SM procedure ends successfully, the TWIF forwards the EAP-Success to the UE.

10) The AMF transmits a registration accept message to the TWIF.

20) The TWIF generates a PDU session acceptance message based on the SM parameter information received from the AUSF and transmits it to the SMF through the AMF along with the request type.

Specifically, the TWIF generates a PDU session establishment request message on behalf of the UE and then transmits it to the AMF.

When the UE receives the EAP-Success, the UE determines that the handover has been successful.

When the scheme shown in FIG. 9 is used, the UE does not need to use a specific PDU session ID while creating a PDU session in 3GPP access. The UE may perform handover by selecting a PDU session to be transferred to a trusted non-3GPP access as needed. However, the UE needs to transmit EAP signaling to directly perform handover.

III. Third Disclosure: Combination of First Disclosure and Second Disclosure

The contents of the above-described first disclosure and the contents of the second disclosure may be combined.

Figure 10:
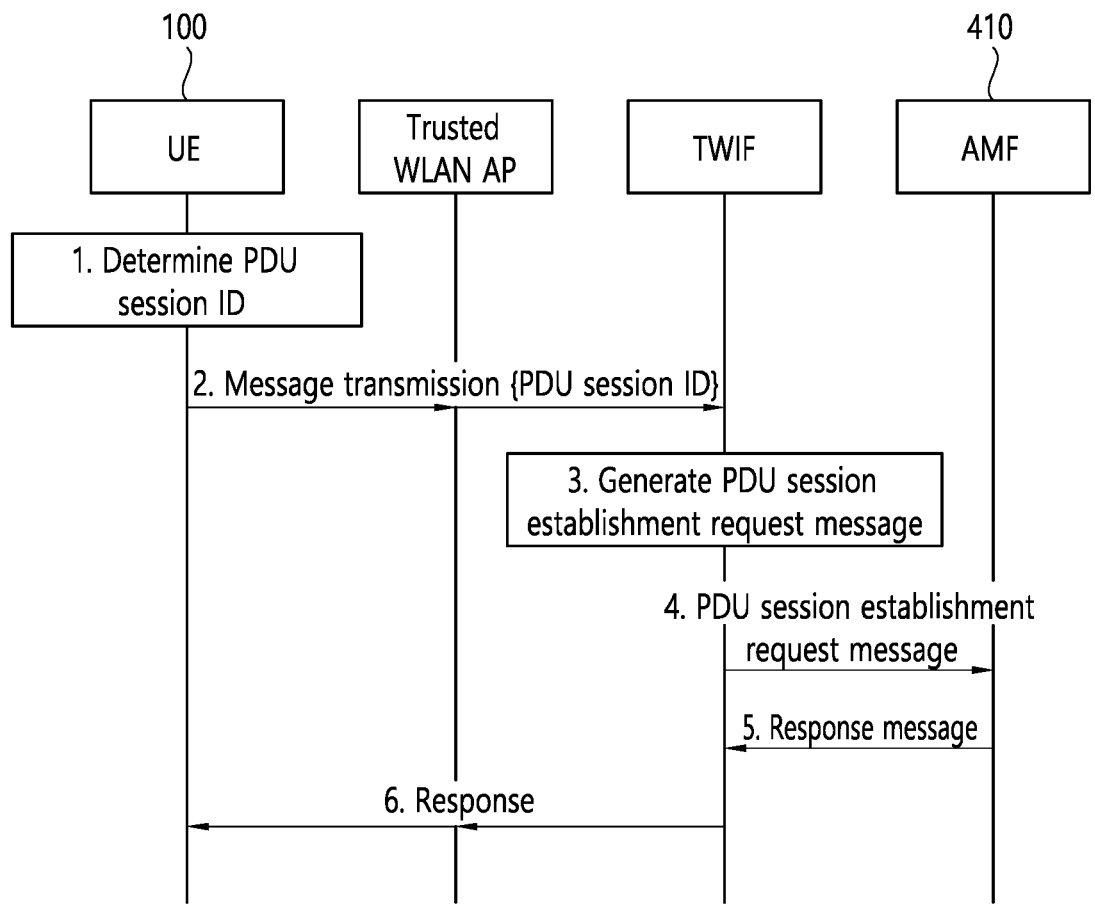
FIG. 10 is a flowchart illustrating a procedure according to the third disclosure of the present specification.

FIG. 10 is a flowchart illustrating a procedure according to the third disclosure of the present specification.

1) The UE determines whether the PDU session is likely to be handed over to non-3GPP access. And the UE may determine the ID of the PDU session according to the determination.

2) And the UE may transmit a message including the determined ID of the PDU session.

The UE may receive information about a PDU session usable in the non-3GPP access from the network.

The ID of the PDU session may be determined based on the received information on the PDU session.

The message may be a PDU session establishment request message.

In this case, the PDU session establishment request message may include a request type set to "existing PDU session" or "initial request".

Alternatively, the message may be an Extensible Authentication Protocol (EAP) message.

In this case, the EAP message may further include one or more of a data network name (DNN), Session Network Slice Selection Assistance Information (S-NSSAI), and a request type.

The EAP message including the ID of the PDU session may be used to cause the network to generate a PDU session establishment request message on behalf of the UE.

3) Upon receiving the message, the TWIF may generate a PDU session establishment request message on behalf of the UE.

4) The TWIF may transmit the PDU session establishment request message to the AMF.

5) The AMF may transmit a response message to the TWIF.

6) The TWIF may transmit a response to the UE.

The contents described so far may be implemented in hardware. This will be described with reference to the drawings.

<General Apparatus to which a Disclosure of the Present Specification May be Applied>

Some of the disclosures of the present specification as described above are summarized as follows.

According to one disclosure of the present specification, a method in a network node for managing mobility in a second Public Land Mobile Network (PLMN) is provided. According to the method, an access request message from the terminal may be received through the base station in the second PLMN. In addition, a response message to the access request of the terminal may be transmitted. Based on the fact that the terminal is a terminal subscribed to the third PLMN, and based on that the base station transmits system information including information on the first PLMN on behalf of the base station of the first PLMN, the response message may include information indicating rejection of the access request of the terminal.

The response message may further include information indicating that roaming to a second PLMN due to a failure occurring in the first PLMN.

The rejection indicated by the information may indicate a temporary rejection so that the terminal can select the first PLMN again after a predetermined time after the access request of the terminal is rejected.

The access request message may be received by the network node of the second PLMN through the base station of the second PLMN instead of the first PLMN due to the failure of the first PLMN.

According to the method, after receiving the access request message from the terminal, it may be determined whether to accept or reject the access request of the terminal. When the network node determines to accept the access request of the terminal, the range of the service may be further determined.

Determining whether to accept or reject the access request of the terminal is performed based on whether the terminal is a terminal subscribed to the third PLMN, and whether the base station transmits system information including information about the first PLMN on behalf of the base station of the first PLMN.

For the determination, information may be obtained from an information server in the third PLMN to which the terminal has subscribed.

The network node may be a Mobility Management Entity (MME), and the access request message may be an attach message.

Alternatively, the network node may be an Access and Mobility Management Function (AMF), and the access request message may be a registration request message.

Hereinafter, an apparatus to which the disclosure of the present specification can be applied will be described.

Figure 11:
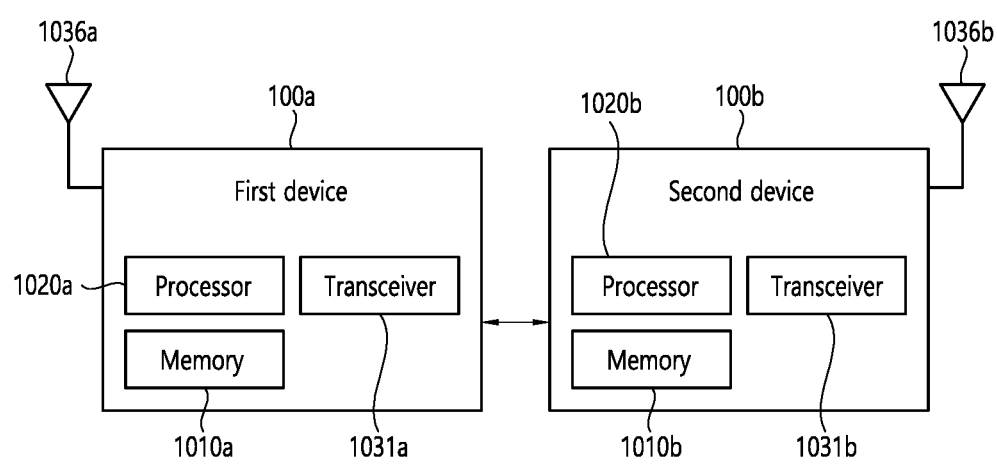
FIG. 11 illustrates a wireless communication system according to an embodiment.

FIG. 11 illustrates a wireless communication system according to an embodiment.

Referring to FIG. 11, the wireless communication system may include a first device 100a and a second device 100b.

The first device 100a may be a device related to a base station, a network node, a transmission terminal, a reception terminal, a wireless device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100b may be a device related to a base station, a network node, a transmission terminal, a reception terminal, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a personal digital assistants (PDA), a portable multimedia player (PMP), a navigation, a slate PC, a tablet PC, an ultrabook, a wearable device (e.g., a watch type terminal (smartwatch), a glass type terminal (smart glass), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 12:
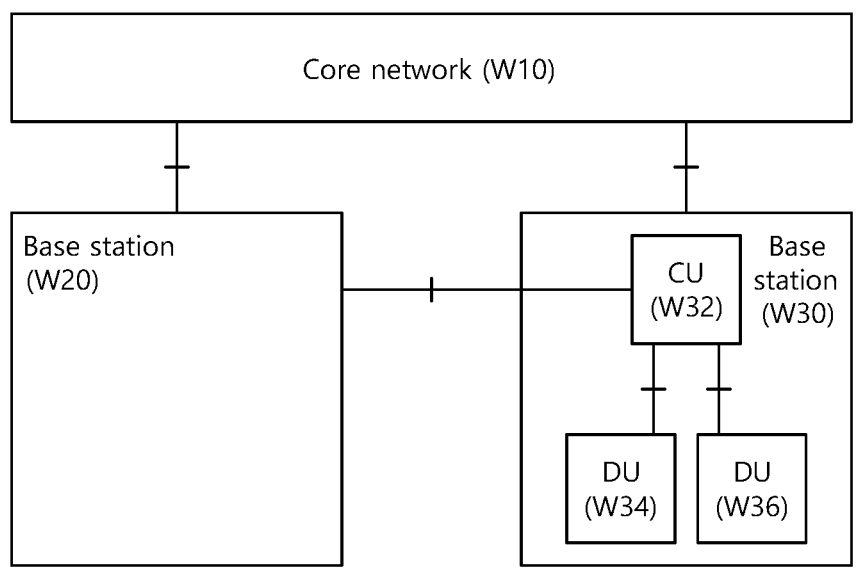
FIG. 12 illustrates a block diagram of a network node according to an embodiment.

FIG. 12 illustrates a block diagram of a network node according to an embodiment.

In particular, FIG. 12 is a diagram more specifically illustrating a network node if a base station is divided into a central unit (CU) and a distributed unit (DU).

Referring to FIG. 12, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts radio resource control (RRC), service data adaptation protocol (SDAP) and packet data convergence protocol (PDCP) layers of the base station (e.g., gNB). The DU W34, W36 may be a logical node that hosts radio link control (RLC), media access control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 13:
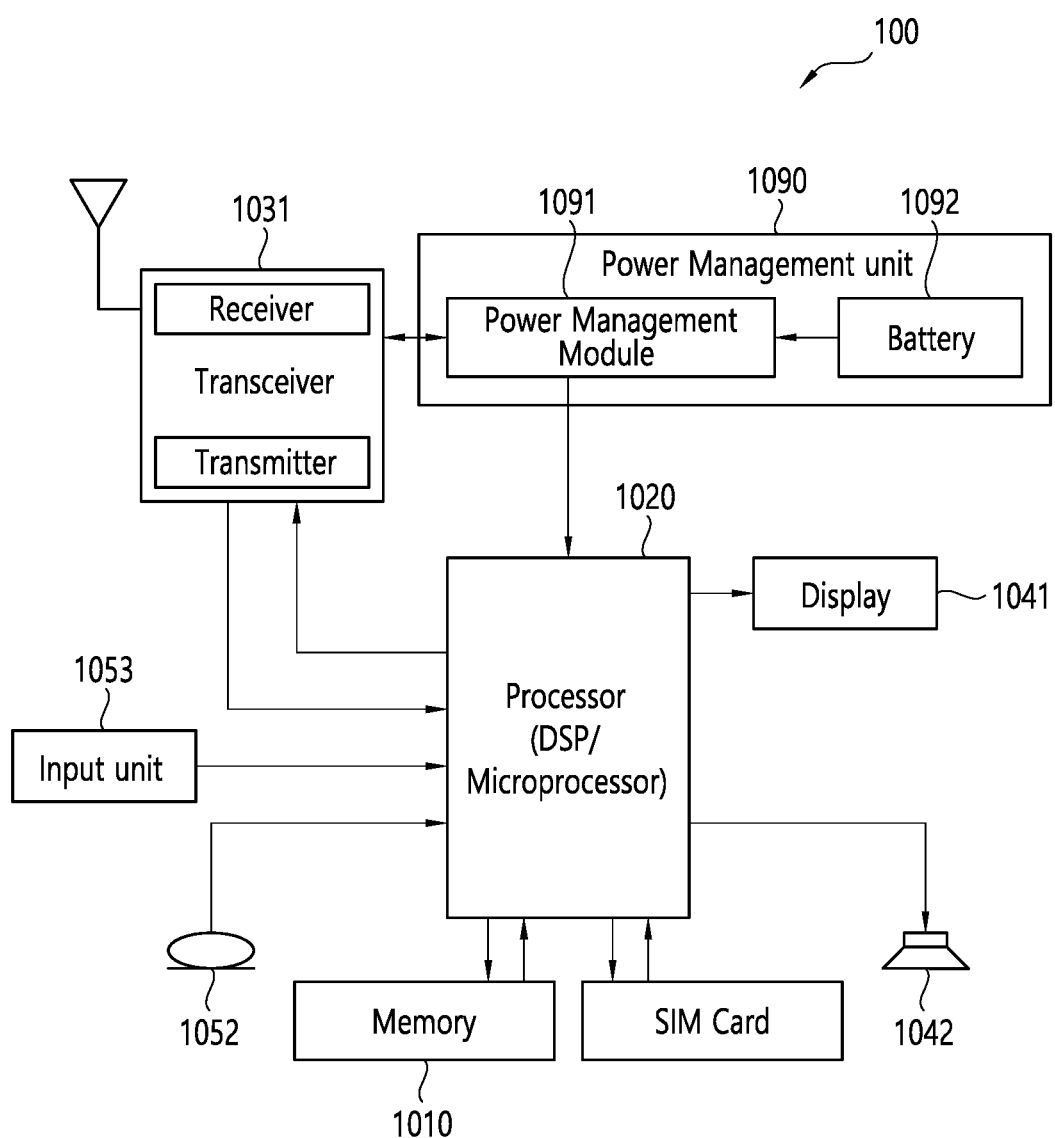
FIG. 13 is a block diagram of a UE according to an embodiment of the present disclosure.

FIG. 13 is a block diagram of a UE according to an embodiment of the present disclosure.

In particular, FIG. 13 is a diagram illustrating the terminal of FIG. 11 in more detail above.

A UE includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the proposed function, process and/or method described in the present disclosure. Layers of a wireless interface protocol may be implemented in the processor 1020. The processor 1020 may include application-specific integrated circuit (ASIC), other chipset, logical circuit and/or data processing apparatus. The processor 1020 may be an application processor (AP). The processor 1020 may include at least one of a digital signal processor (DSP), a central processing unit (CPU), a graphics processing unit (GPU) and a modulator and demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store international mobile subscriber identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include read-only memory (ROM), random access memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020 in a way to operate and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

<Scenarios to which the Disclosure of the Present Disclosure is Applicable>

Hereinafter, scenarios to which the present disclosure is applicable are described.

In the present disclosure, an always-on PDU session for URLLC having a low-latency characteristic may be used for artificial intelligence, robots, autonomous driving, extended reality, and the like among the 5G scenarios below.

Figure 14:
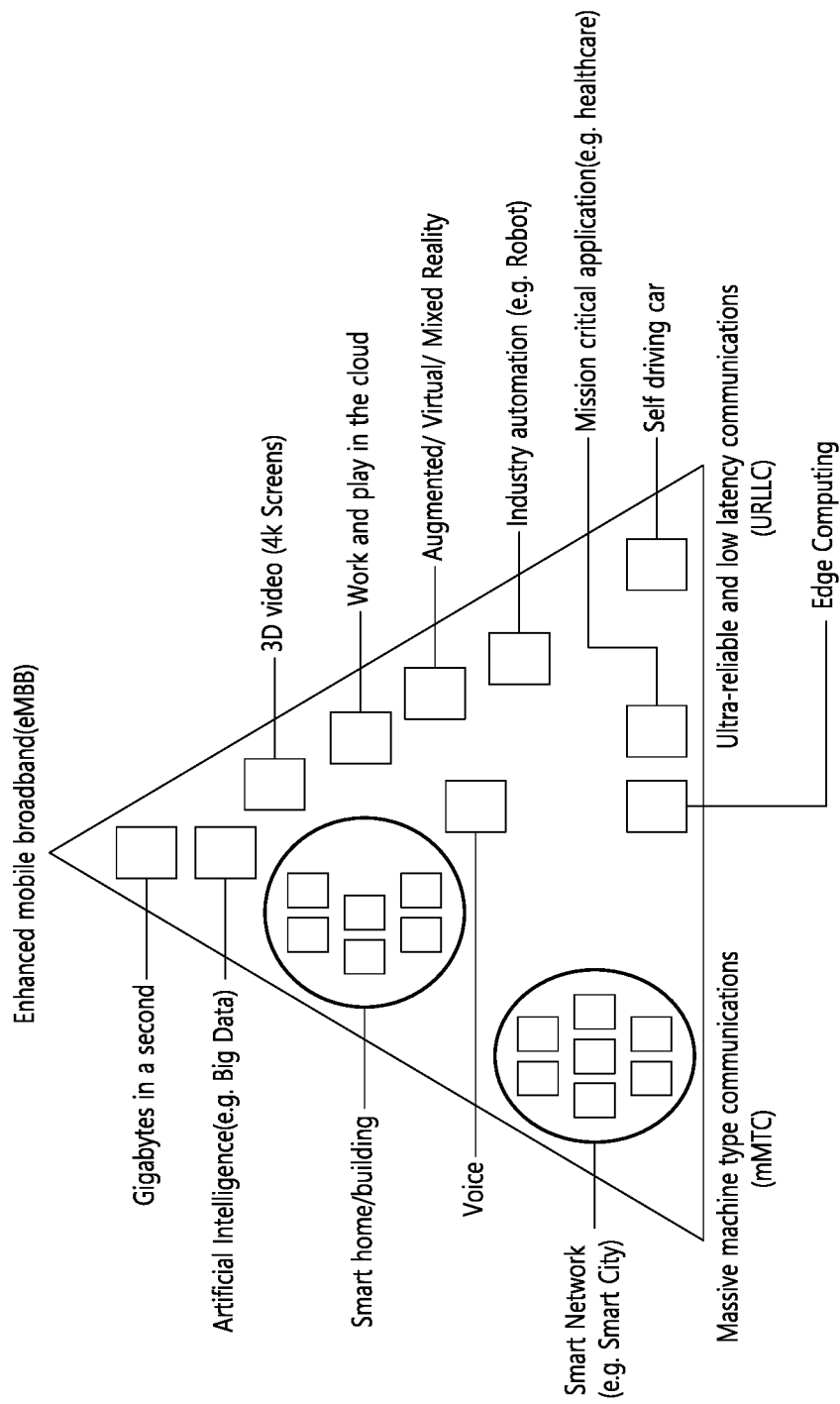
FIG. 14 illustrates an example of 5G use scenarios.

FIG. 14 illustrates an example of 5G use scenarios.

The 5G usage scenarios illustrated in FIG. 14 are merely exemplary, and the technical features of the present disclosure may also be applied to other 5G usage scenarios that are not illustrated in FIG. 14.

Referring to FIG. 14, three major requirement areas of 5G include: (1) an enhanced mobile broadband (eMBB) area, (2) a massive machine type communication (mMTC) area, and (3) an ultra-reliable and low latency communications (URLLC) area. Some examples of usage may require multiple areas for optimization, while other examples of usage may focus only on one key performance indicator (KPI). The 5G supports these various examples of usage in a flexible and reliable way.

The eMBB focuses generally on improvements in data rate, latency, user density, and capacity and coverage of mobile broadband access. The eMBB aims at a throughput of about 10 Gbps. The eMBB makes it possible to far surpass basic mobile Internet access, and covers full-duplex operations, media in cloud or augmented reality, and entertainment applications. Data is one of the key drivers of 5G, and it may not be possible to see dedicated voice services for the first time in the 5G era. In 5G, voice is expected to be processed as an application program simply using data connection provided by a communication system. A main reason for an increased traffic volume is an increase in content size and an increase in the number of applications requiring high data rates. Streaming services (audio and video), interactive video and mobile Internet connections will become more prevalent as more devices are connected to the Internet. Many of these applications require always-on connectivity to push real-time information and notifications to users. Cloud storage and applications are rapidly increasing in mobile communication platforms, which may be applied to both work and entertainment. Cloud storage is a special use case that drives the growth of uplink data rates. 5G is also used for remote work in the cloud and requires much lower end-to-end latency to maintain a good user experience when tactile interfaces are used. In entertainment, for example, cloud gaming and video streaming are another key factor requiring improvement in mobile broadband capabilities. Entertainment is essential on smartphones and tablets anywhere, including in highly mobile environments such as trains, cars and airplanes. Another use case is augmented reality and information retrieval for entertainment. Here, augmented reality requires very low latency and an instantaneous data amount.

The mMTC, which is designed to enable communication between a large number of low-cost devices powered by batteries, is provided to support smart metering, logistics, fields, and applications such as body sensors. The mMTC aims at about 10-year batteries and/or about one million devices per km'. The mMTC enables seamless connection of embedded sensors in all fields to form a sensor network and is one of the most anticipated 5G use cases. Potentially, IoT devices are predicted to reach 20.4 billion by 2020. Smart networks utilizing industrial IoT is one of the areas where 5G plays a key role in enabling smart cities, asset tracking, smart utilities, agriculture and security infrastructure.

The URLLC, which enables devices and machines to communicate with high reliability, very low latency, and high availability, are ideal for vehicle communications, industrial control, factory automation, telesurgery, smart grid, and public safety applications. The URLLC aims at a delay of about 1 ms. The URLLC includes new services that will change the industry through ultra-reliable/low-latency links such as remote control of key infrastructures and autonomous vehicles. Levels of reliability and latency are essential for smart grid control, industrial automation, robotics, and drone control and adjustment.

Next, a plurality of usage examples included in the triangle of FIG. 14 will be described in more detail.

5G, which is a means of providing streams that are rated as hundreds of megabits per second to a gigabit per second, may complement fiber-to-the-home (FTTH) and cable-based broadband (or data over cable service interface specifications (DOCSIS)). Such a high speed may be required to deliver TVs with resolution of 4K or higher (6K, 8K and higher) as well as virtual reality (VR) and augmented reality (AR). VR and AR applications involve almost immersive sports events. Specific applications may require special network configuration. For example, in the case of VR games, a game company may need to integrate a core server with an edge network server of a network operator to minimize latency.

Automotive is expected to be an important new driver for 5G together with many use cases for mobile communication regarding vehicles. For example, entertainment for passengers require both high capacity and high mobile broadband. The reason is because future users will continue to expect high-quality connections, regardless of their location and speed. Another use case in the automotive sector is an augmented reality dashboard. The augmented reality dashboard allows drivers to identify objects in the dark on top of what they see through a front window. The augmented reality dashboard superimposes information to be provided to the driver regarding a distance and movement of objects. In the future, wireless modules will enable communication between vehicles, exchange of information between a vehicle and a supporting infrastructure, and exchange of information between a vehicle and other connected devices (e.g., devices carried by pedestrians). A safety system may lower the risk of accidents by guiding the driver to alternative courses of action to make driving safer. A next step will be a remotely controlled vehicle or an autonomous vehicle. This requires very reliable and very fast communication between different autonomous vehicles and/or between vehicles and infrastructure. In the future, autonomous vehicles will perform all driving activities and drivers will be forced to focus only on traffic anomalies that the vehicle itself cannot identify. The technical requirements of autonomous vehicles require ultra-low latency and ultra-fast reliability to increase traffic safety to levels that cannot be achieved by humans.

Smart cities and smart homes referred to as smart society will be embedded with high-density wireless sensor networks as an example of smart networks. A distributed network of intelligent sensors will identify the conditions for cost and energy efficient maintenance of a city or home. A similar setup may be done for each household. Temperature sensors, window and heating controllers, burglar alarms, and home appliances are all wirelessly connected. Many of these sensors typically require low data rates, low power, and low cost. However, for example, real-time HD video may be required in certain types of devices for surveillance.

The consumption and distribution of energy including heat or gas is highly decentralized, requiring automated control of distributed sensor networks. A smart grid interconnects these sensors using digital information and communication technologies to collect information and act accordingly. This information may include the behavior of suppliers and consumers, so that the smart grid may improve efficiency, reliability, economical efficiency, sustainability of production, and a distribution of fuels such as electricity in an automated manner. The smart grid may also be considered as another low-latency sensor network.

A health sector has many applications that may benefit from mobile communications. The communication system may support telemedicine providing clinical care from remote locations. This may help reduce barriers to distance and improve access to medical services that are not consistently available in remote rural areas. It is also used to save lives in critical care and emergencies. A wireless sensor network based on mobile communication may provide remote monitoring and sensors for parameters such as a heart rate and blood pressure.

Wireless and mobile communications are becoming increasingly important in industrial applications. Wiring is expensive to install and maintain. Thus, a possibility of replacing cables with reconfigurable wireless links is an attractive opportunity for many industries. However, achieving this requires that a wireless connection operates with a delay, reliability and capacity similar to those of a cable and requires simplified management. Low latency and very low error probability are new requirements that need to be connected to 5G.

Logistics and cargo tracking is an important use case for mobile communications that enables tracking of inventory and packages from anywhere using a location-based information system. Logistics and freight tracking use cases typically require low data rates but require a wide range and reliable location information.

<Artificial Intelligence (AI)>

Artificial intelligence refers to a field of studying artificial intelligence or a methodology for creating the same, and machine learning refers to a field of defining various problems dealing in an artificial intelligence field and studying methodologies for solving the same. The machine learning may be defined as an algorithm for improving performance with respect to a certain task through repeated experiences with respect to the task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value.

An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse.

Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc.

The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method.

Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot may refer to a machine which automatically handles a given task by its own ability, or which operates autonomously. Particularly, a robot that functions to recognize an environment and perform an operation according to its own judgment may be referred to as an intelligent robot.

Robots may be classified into, for example, industrial, medical, household, and military robots, according to the purpose or field of use.

A robot may include an actuator or a driving unit including a motor in order to perform various physical operations, such as moving joints of the robot. In addition, a movable robot may include, for example, a wheel, a brake, and a propeller in the driving unit thereof, and through the driving unit, may thus be capable of traveling on the ground or flying in the air.

<Self-Driving or Autonomous-Driving>

Autonomous driving refers to self-driving technology, and an autonomous vehicle refers to a vehicle that moves without any manipulation by a user or with minimum manipulation by a user.

For example, autonomous driving may include all of a technology for keeping a vehicle within a driving lane, a technology for automatically controlling a speed such as an adaptive cruise control, a technology for automatically driving the vehicle along a determined route, and a technology for, when a destination is set, automatically setting a route and driving the vehicle along the route.

A vehicle includes a vehicle having only an internal combustion engine, a hybrid vehicle having both an internal combustion engine and an electric motor, and an electric vehicle having only an electric motor, and may include not only an automobile but also a train, a motorcycle, or the like.

In this case, an autonomous vehicle may be considered as a robot with an autonomous driving function.

<Extended Reality; XR>

Extended reality collectively refers to virtual reality (VR), augmented reality (AR), and mixed reality (MR). The VR technology provides real world objects or backgrounds only in CG images, the AR technology provides virtual CG images together with real object images, and the MR technology is computer graphic technology for mixing and combining virtual objects with the real world.

The MR technology is similar to the AR technology in that both real and virtual objects are shown together. However, there is a difference in that a virtual object is used to complement a real object in the AR technology, whereas a virtual object and a real object are used in an equivalent nature in the MR technology.

The XR technology may be applied to a head-mount display (HMD), a head-up display (HUD), a mobile phone, a tablet PC, a laptop, a desktop, a TV, digital signage, etc. A device to which the XR technology is applied may be referred to as an XR device.

Figure 15:
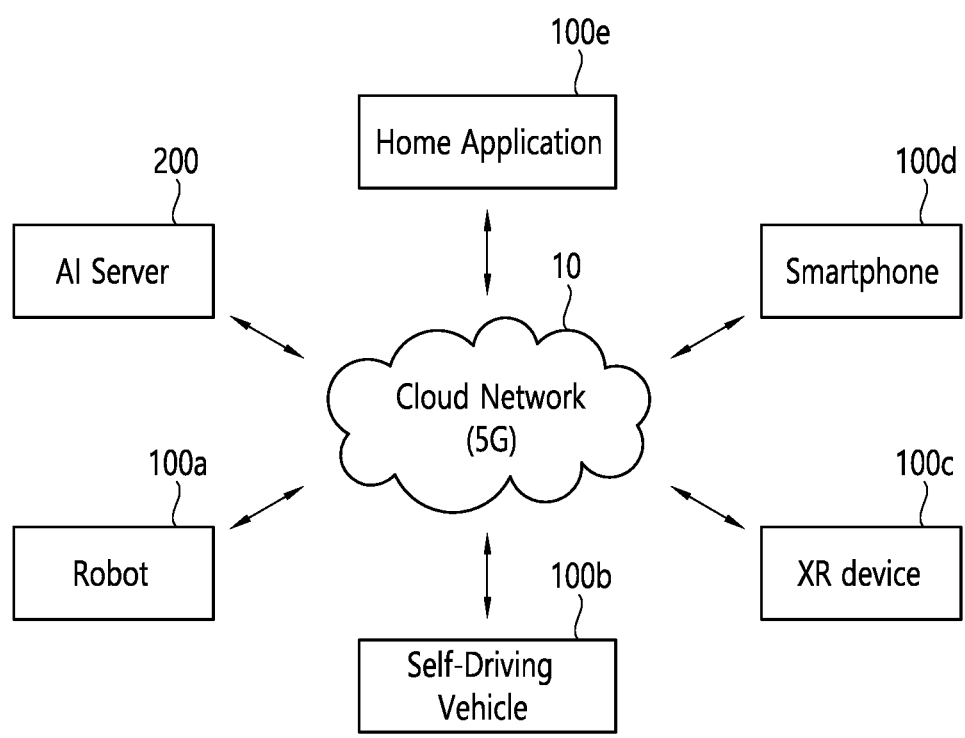
FIG. 15 shows an AI system 1 according to an embodiment.

FIG. 15 shows an AI system 1 according to an embodiment.

Referring to FIG. 15, an AI system 1 is connected to at least one of an AI server 200, a robot 100a, a self-driving vehicle 100b, an XR device 100c, a smartphone 100d, or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may be a network that constitutes a part of a cloud computing infrastructure or a network that exists in the cloud computing infrastructure. Here, the cloud network 10 may be configured using a 3G network, a 4G or long term evolution (LTE) network, or a 5G network.

The devices 100a to 100e and 200 configuring the AI system 1 may be interconnected over the cloud network. Particularly, the devices 100a to 100e and 200 may communicate with each other through a base station but may directly communicate with each other without the intervention of a base station.

The AI server 200 may include a server that performs AI processing and a server that performs an operation on big data.

The AI server 200 is connected to at least one of the robot 100*a*, the self-driving vehicle 100*b*, the XR device 100*c*, the smartphone 100*d* or the home appliances 100*e*, that is, AI devices configuring the AI system, over the cloud network 10 and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model and may generate a response or control command based on the deduced result value.

Hereinafter, various embodiments of the AI devices 100*a* to 100*e* to which the aforementioned technology is applied will be described.

<AI+Robot>

The robot 100*a*, which adopts an AI technology, may be implemented as a guide robot, a transport robot, a cleaning robot, a wearable robot, an entertainment robot, a pet robot, an unmanned flying robot, and the like.

The robot 100*a* may include a robot control module for controlling an operation, and the robot control module may refer to a software module or a chip implemented with hardware.

The robot 100*a* may acquire status information of the robot 100*a* using sensor information acquired from various types of sensors, detect (recognize) surrounding environments and objects, generate map data, determine moving routes and driving plans, determine responses to user interactions, or determine actions.

Here, the robot 100*a* may use sensor information obtained from at least one sensor from among lidar, radar, and camera to determine a moving route and a driving plan.

The robot 100*a* may perform the above operations using a learning model including at least one artificial neural network. For example, the robot 100*a* may recognize a surrounding environment and an object using a learning model and may determine an operation using the recognized surrounding environment information or object information. Here, the learning model may be directly learned by the robot 100*a* or learned by an external device such as the AI server 200.

Here, the robot 100*a* may directly generate a result using a learning model and perform an operation, or transmit sensor information to an external device such as the AI server 200, receive a result generated accordingly, and perform an operation.

The robot 100*a* may determine a moving path and a driving plan using at least one of map data, object information detected from sensor information, or object information acquired from an external device, and control a driving unit to drive the robot 100*a* according to the moving path and the driving plan.

The map data may include object identification information on various objects arranged in a space in which the robot 100*a* moves. For example, the map data may include object identification information on fixed objects such as walls and doors and movable objects such as flower pots and desks. In addition, the object identification information may include a name, a type, a distance, and a location.

In addition, the robot 100*a* may perform an operation or run by controlling the driving unit based on the user's control/interaction. In this case, the robot 100*a* may acquire interaction intention information according to a user's motion or voice speech, determine a response based on the acquired intention information, and perform an operation.

<AI+Autonomous-Driving/Self-Driving>

The autonomous vehicle 100*b* may be implemented as a mobile robot, a vehicle, an unmanned aerial vehicle, etc., to which AI technology is applied.

The autonomous vehicle 100*b* may include an autonomous driving control module for controlling the autonomous driving function, and the autonomous driving control module may refer to a software module and/or a chip implementing the software module. The autonomous driving control module may be included in the autonomous vehicle 100*b* as a component of the autonomous vehicle 100*b*, but may be connected to the outside of the autonomous vehicle 100*b* with separate hardware.

The autonomous vehicle 100*b* may acquire the state information of the autonomous vehicle 100*b* using the sensor information acquired from various kinds of sensors and/or detect (recognize) the surrounding environment and/or the object, and/or generate map data, and/or determine a travel route and/or a travel plan, and/or determine an operation.

Like the robot 100*a*, the autonomous vehicle 100*b* can use the sensor information acquired from at least one sensor among the LIDAR, the radar, and/or the camera to determine the travel route and/or the travel plan.

In particular, the autonomous vehicle 100*b* can recognize an environment and/or an object for an area in which the field of view is obscured and/or over a certain distance by receiving sensor information from external devices, and/or receive the recognized information directly from external devices.

The autonomous vehicle 100*b* can perform the above-described operations using a learning model composed of at least one ANN. For example, the autonomous vehicle 100*b* can recognize the surrounding environment and/or the object using the learning model, and can determine the travel route using the recognized surrounding information and/or the object information. The learning model may be learned directly from the autonomous vehicle 100*b* and/or learned from an external device such as the AI server 200.

In this case, the autonomous vehicle 100*b* may perform an operation by generating a result using a direct learning model, but the autonomous vehicle may also perform operation by transmitting sensor information to an external device such as the AI server 200 and receiving the generated result.

The autonomous vehicle 100*b* may determine the travel route and/or the travel plan using at least one of the map data, the object information detected from the sensor information and/or the object information acquired from the external device, and drive the autonomous vehicle 100*b* according to the determined travel route and/or travel plan by controlling the driving unit.

The map data may include object identification information on various objects arranged in a space (e.g. road) in which the autonomous vehicle 100*b* moves. For example, the map data may include object identification information on fixed objects such as street lamps, rocks, and buildings, and/or on movable objects such as vehicles and pedestrians. The object identification information may include a name, a type, a distance, and/or a position, etc.

Also, the autonomous vehicle 100*b* may perform the operation and/or run by controlling the driving unit based on the control/interaction of the user. The autonomous vehicle 100*b* may acquire the intention information of the interaction due to the user's operation and/or voice utterance, determine the response based on the acquired intention information, and perform the operation.

<AI+XR>

The XR device 100*c* may be implemented as a HMD, a HUD, a TV, a mobile phone, a smartphone, a computer, a wearable device, a home appliance, a digital signage, a vehicle, a fixed robot, a mobile robot, etc., to which AI technology is applied.

The XR device 100*c* analyzes the three-dimensional point cloud data and/or image data acquired from various sensors and/or from an external device to generate position data and/or attribute data for the three-dimensional points, thereby obtaining information about the surrounding space and/or the real object, and outputting the rendered XR object. For example, the XR device 100*c* may output an XR object, which includes the additional information about the recognized object, by corresponding to the recognized object.

The XR device 100*c* can perform the above-described operations using a learning model composed of at least one ANN. For example, the XR device 100*c* can recognize a real object from three-dimensional point cloud data and/or image data using the learning model, and can provide information corresponding to the recognized real object. The learning model may be learned directly from the XR device 100*c* and/or learned from an external device such as the AI server 1200.

In this case, the XR device 100*c* may perform an operation by generating a result using a direct learning model, but the autonomous vehicle may also perform operation by transmitting sensor information to an external device such as the AI server 200 and receiving the generated result.

<AI+Robot+Autonomous-Driving/Self-Driving>

The robot 100*a* may be implemented as a guide robot, a carrying robot, a cleaning robot, a wearable robot, an entertainment robot, a pet robot, an unmanned flying robot, etc., to which AI technology and autonomous-driving technology are applied.

The robot 100*a*, to which the AI technology and the autonomous-driving technology are applied, may mean the robot 100*a* having the autonomous-driving function itself and/or the robot 100*a* interacting with the autonomous vehicle 100*b*.

The robot 100*a* having an autonomous-driving function can collectively refer to devices that move by themselves in accordance with a given travel route and/or move by determining the traveling route by themselves without user's control.

The robot 100*a* having the autonomous-driving function and the autonomous vehicle 100*b* can use a common sensing method to determine at least one of the travel route and/or the travel plan. For example, the robot 100*a* having the autonomous-driving function and the autonomous vehicle 100*b* can determine at least one of the travel route and/or the travel plan using the information sensed through the LIDAR, the radar, and/or the camera.

The robot 100*a* interacting with the autonomous vehicle 100*b* may exist separately from the autonomous vehicle 100*b*, and the robot 100*a* interacting with the autonomous vehicle 100*b* may be associated with the autonomous-driving function inside and/or outside the autonomous vehicle 100, and/or may perform an operation associated with the user aboard the autonomous vehicle 100*b*.

The robot 100*a* interacting with the autonomous vehicle 100*b* may acquire the sensor information on behalf of the autonomous vehicle 100*b* and provide it to the autonomous vehicle 100*b*, or the robot 100*a* interacting with the autonomous vehicle 100*b* may obtain the sensor information and generate the environment information and/or the object information to provide the autonomous vehicle 100*b*, thereby controlling and/or assisting the autonomous-driving function of the autonomous vehicle 100*b*.

Or, the robot 100*a* interacting with the autonomous vehicle 100*b* may monitor the user boarding the autonomous vehicle 100*b* and/or may control the functions of the autonomous vehicle 100*b* through interaction with the user. For example, when it is determined that the driver is in a drowsy state, the robot 100*a* may activate the autonomous-driving function of the autonomous vehicle 100*b* and/or assist the control of the driving unit of the autonomous vehicle 100*b*. The function of the autonomous vehicle 100*b* controlled by the robot 100*a* may include not only an autonomous-driving function but also a function provided by a navigation system and/or an audio system provided in the autonomous vehicle 100*b*.

Or, the robot 100*a* interacting with the autonomous vehicle 100*b* may provide information and/or assist the function to the autonomous vehicle 100*b* outside the autonomous vehicle 100*b*. For example, the robot 100*a*, such as a smart traffic light, may provide traffic information including signal information, etc., to the autonomous vehicle 100*b*. The robot 100*a*, such as an automatic electric charger of an electric vehicle, may interact with the autonomous vehicle 100*b* to connect the electric charger to the charging hole automatically.

<AI+Robot+XR>

The robot 100*a* may be implemented as a guide robot, a carrying robot, a cleaning robot, a wearable robot, an entertainment robot, a pet robot, an unmanned flying robot, a drone, etc., to which AI technology and XR technology are applied.

The robot 100*a* to which the XR technology is applied may refer to a robot that is subject to control/interaction in the XR image. In this case, the robot 100*a* may be separated from the XR device 100*c* and can be associated with each other.

When the robot 100*a* that is the subject to control/interaction in the XR image acquires the sensor information from the sensors including the camera, the robot 100*a* and/or the XR device 100*c* may generate an XR image based on the sensor information and the XR device 100*c* can output the generated XR image. The robot 100*a* can operate based on a control signal and/or a user's interaction input through the XR device 100*c*.

For example, the user can acknowledge the XR image corresponding to the viewpoint of the robot 100*a* remotely linked through the external device such as the XR device 100*c*, and can adjust the autonomous travel path of the robot 100*a*, control operation and/or driving, or check the information of neighboring objects, through interaction.

<AI+Autonomous-Driving/Self-Driving+XR>

The autonomous vehicle 100*b* may be implemented as a mobile robot, a vehicle, an unmanned aerial vehicle, etc., to which AI technology and XR technology are applied.

The autonomous driving vehicle 100*b* to which the XR technology is applied may mean an autonomous vehicle having means for providing an XR image and/or an autonomous vehicle that is subject to control/interaction in the XR image. Particularly, the autonomous vehicle 100*b* that is subject to control/interaction in the XR image may be separated from the XR device 100*c* and can be associated with each other.

The autonomous vehicle 100*b* having the means for providing the XR image can acquire the sensor information from the sensors including the camera and output the generated XR image based on the acquired sensor information. For example, the autonomous vehicle 100*b* may include an HUD to output an XR image, thereby providing a passenger with a real object and/or an XR object corresponding to an object in the screen.

At this time, when the XR object is output to the HUD, at least a part of the XR object may be output so as to overlap with the actual object that the passenger's gaze is directed to. On the other hand, when the XR object is output to the display provided in the autonomous vehicle 100*b*, at least a part of the XR object may be output so as to overlap with the object in the screen. For example, the autonomous vehicle 100*b* can output XR objects corresponding to objects such as a lane, another vehicle, a traffic light, a traffic sign, a two-wheeled vehicle, a pedestrian, a building, etc.

When the autonomous vehicle 100*b* that is the subject to control/interaction in the XR image acquires the sensor information from the sensors including the camera, the autonomous vehicle 100*b* and/or the XR device 100*c* may generate an XR image based on the sensor information and the XR device 100*c* can output the generated XR image. The autonomous vehicle 100*b* can operate based on a control signal and/or a user's interaction input through the XR device 100*c*.

In the above, preferred embodiments have been exemplarily described, but the disclosure of the present specification is not limited to such specific embodiments, and thus, modifications, changes, or can be improved.

What is claimed is:

1. A user equipment (UE) for establishing a protocol data unit (PDU) session, comprising: a transceiver; and
    a processor for controlling the transceiver, wherein the processor is configured to:
    transmit a PDU session establishment request message via access;
    receive a PDU session establishment accept message via a 3rd Generation Partnership Project (3GPP) access;
    based on the PDU session accept message being received, determine that a first PDU session via the 3GPP access has been established;
    determine, by the UE, that the first PDU session via the 3GPP access whether the PDU session will be handed over to a non-3GPP non-3rd Generation Partnership Project (non-3GPP) access;
    determine, by the UE, a PDU session ID for the first PDU session as a PDU session ID used only for the non-3GPP access, based on the first PDU session handed over to the non-3GPP access;
    and transmit, by the UE, an Extensible Authentication Protocol (EAP) message including the PDU session ID of the first PDU session to Trusted WLAN Interworking Function (TWIF) node via the non-3GPP access, based on the UE not supporting Non-Access Stratum (NAS) signaling in the non-3GPP access,
    wherein the message enables the TWIF node to generate a PDU session establishment request message.

2. The UE of claim 1, wherein the processor is further configured to:
    receive information related to a PDU session usable in the non-3GPP access from the network, wherein the ID of the PDU session is determined based on the received information related to the PDU session.

3. The UE of claim 1, wherein the PDU session establishment request message includes a request type set to "existing PDU session" or "initial request".

4. The UE of claim 1,
    wherein the EAP message further includes one or more of a data network name (DNN), Session Network Slice Selection Assistance Information (S-NSSAI) and a request type.

5. A method performed by a user equipment (UE) for establishing a protocol data unit (PDU) session, the method comprising:
    transmitting a PDU session establishment request message via access;
    receiving a PDU session establishment accept message via a 3rd Generation Partnership Project (3GPP) access;
    based on the PDU session accept message being received, determining that a first PDU session via the 3GPP access has been established;
    determining, by the UE, that the first PDU session via the 3GPP access will be handed over to a non-3GPP access;
    determining, by the UE, a PDU session ID for the first PDU session as a PDU session ID used only for the non-3GPP access, based on the first PDU session handed over to the non-3GPP access; and
    transmitting, by the UE, an Extensible Authentication Protocol (EAP) message including the PDU session ID of the first PDU session to Trusted WLAN Interworking Function (TWIF) node via the non-3GPP access, based on the UE not supporting Non-Access Stratum (NAS) signaling in the non-3GPP access,
    wherein the message enables the TWIF node to generate a PDU session establishment request message.

6. The method of claim 5, wherein the method further comprises:
    receiving information related to a PDU session usable in the non-3GPP access from the network,
    wherein the ID of the PDU session is determined based on the received information related to the PDU session.

7. The method of claim 5, wherein the PDU session establishment request message includes a request type set to "existing PDU session" or "initial request".

8. The method of claim 5,
    wherein the EAP message further includes one or more of a data network name (DNN), Session Network Slice Selection Assistance Information (S-NSSAI) and a request type.

* * * * *